US009091333B2

(12) United States Patent
Howard et al.

(10) Patent No.: US 9,091,333 B2
(45) Date of Patent: Jul. 28, 2015

(54) LOADING MACHINE FOR FEEDING A RECEIVER

(71) Applicant: General Dynamics—OTS, Inc., St. Petersburg, FL (US)

(72) Inventors: William E. Howard, Richmond, VT (US); Victor J. Forrester, Milton, VT (US)

(73) Assignee: General Dynamics—OTS, Inc., St. Petersburg, FL (US)

( * ) Notice: Subject to any disclaimer, the term of this patent is extended or adjusted under 35 U.S.C. 154(b) by 239 days.

(21) Appl. No.: 13/784,359

(22) Filed: Mar. 4, 2013

(65) Prior Publication Data

US 2014/0109703 A1    Apr. 24, 2014

Related U.S. Application Data

(63) Continuation-in-part of application No. 12/985,134, filed on Jan. 5, 2011, now Pat. No. 8,720,289.

(51) Int. Cl.
*F16H 25/12*    (2006.01)
*F41A 9/42*    (2006.01)
*F41A 9/06*    (2006.01)

(52) U.S. Cl.
CPC ............... *F16H 25/122* (2013.01); *F41A 9/42* (2013.01); *F41A 9/06* (2013.01); *Y10T 74/18312* (2015.01)

(58) Field of Classification Search
CPC ....... F16H 25/122; F16H 25/12; F16H 53/08; F41A 7/10; F41A 9/42; F41A 17/18; F41A 9/06; B65H 54/2809; B65H 54/2818
USPC .............. 74/29, 30, 31, 33, 55–59, 89, 89.16, 74/89.17, 89.29, 132, 130, 131; 89/11, 47, 89/187.01
See application file for complete search history.

(56) References Cited

U.S. PATENT DOCUMENTS

| 2,747,417 A * | 5/1956 | Brown .............................. 74/57 |
| 2,967,006 A | 1/1961 | Sykes |
| 3,241,448 A | 3/1966 | Rocha |
| 3,398,904 A | 8/1968 | Adams et al. |

(Continued)

OTHER PUBLICATIONS

USPTO, Final Office Action for U.S. Appl. No. 12/985,134, mailed Jun. 19, 2013.

(Continued)

*Primary Examiner* — William Kelleher
*Assistant Examiner* — Valentin Craciun
(74) *Attorney, Agent, or Firm* — Ingrassia, Fisher & Lorenz, P.C.

(57) ABSTRACT

A loading machine includes a drum cam configured to rotate and having a cam path. A first track is positioned proximate the drum cam. A rammer subassembly is engaged with the drum cam and the first track. The rammer subassembly is configured to move between an extended position and a retracted position as the drum cam rotates. The rammer subassembly has a first rammer section engaged with the cam path and configured to move longitudinally during rotation of the drum cam. The first rammer section includes a first gear engaged with the first track such that longitudinal movement of the first rammer section causes rotation of the first gear. A second rammer section is telescopically coupled with the first rammer section and is engaged with the first gear such that rotation of the first gear causes the second rammer section to telescopically move with respect to the first rammer section.

18 Claims, 22 Drawing Sheets

(56) References Cited

U.S. PATENT DOCUMENTS

| | | | | |
|---|---|---|---|---|
| 3,412,995 | A | * | 11/1968 | Parups .................... 271/268 |
| 3,535,980 | A | | 10/1970 | Chiabrandy et al. |
| 3,648,561 | A | * | 3/1972 | Stoner ................... 89/11 |
| 3,937,331 | A | | 2/1976 | Spercel |
| 4,052,266 | A | | 10/1977 | Griffith |
| 4,069,724 | A | | 1/1978 | Sobotta |
| 4,114,511 | A | | 9/1978 | Patenaude |
| 4,131,052 | A | * | 12/1978 | Skahill ................... 89/11 |
| 4,154,143 | A | | 5/1979 | Pechamat et al. |
| 4,187,748 | A | | 2/1980 | Evans |
| 4,244,270 | A | * | 1/1981 | Tassie ................... 89/33.2 |
| 4,294,158 | A | | 10/1981 | Patenaude et al. |
| 4,309,933 | A | * | 1/1982 | Bains ................... 89/9 |
| 4,330,927 | A | | 5/1982 | Wolfthal |
| 4,397,174 | A | | 8/1983 | Jungesjo |
| 4,535,642 | A | | 8/1985 | Ohmura |
| 4,592,244 | A | * | 6/1986 | Nagata et al. ................... 74/57 |
| 4,807,513 | A | * | 2/1989 | Post et al. ................... 89/11 |
| 4,871,138 | A | | 10/1989 | Sauter |
| 4,914,967 | A | * | 4/1990 | Proulx et al. ................... 74/57 |
| 5,087,316 | A | | 2/1992 | Sumiuchi et al. |
| 5,292,214 | A | | 3/1994 | Bishop |
| 5,353,690 | A | * | 10/1994 | Shin ................... 92/86 |
| 5,465,444 | A | * | 11/1995 | Bigler et al. ................... 15/22.1 |
| 5,581,975 | A | | 12/1996 | Trebbi et al. |
| 5,642,650 | A | | 7/1997 | Roote et al. |
| 5,860,764 | A | | 1/1999 | Roberts |
| 6,170,296 | B1 | * | 1/2001 | Kawachi ................... 65/318 |
| 6,216,394 | B1 | * | 4/2001 | Fenelon ................... 49/349 |
| 6,227,065 | B1 | * | 5/2001 | Petersen ................... 74/422 |
| 6,308,502 | B1 | | 10/2001 | Olson et al. |
| 6,363,687 | B1 | | 4/2002 | Luciano et al. |
| 6,964,411 | B2 | | 11/2005 | Pooschen |
| 7,581,926 | B1 | * | 9/2009 | Dehlsen et al. ................... 416/87 |
| 2005/0088757 | A1 | | 4/2005 | Tsuzuki |
| 2005/0200975 | A1 | | 9/2005 | Makii et al. |
| 2006/0001759 | A1 | | 1/2006 | Raschke |
| 2006/0045503 | A1 | | 3/2006 | Ishizuka et al. |
| 2010/0275716 | A1 | | 11/2010 | Mourad et al. |
| 2011/0100144 | A1 | | 5/2011 | Neelakantan et al. |

OTHER PUBLICATIONS

USPTO, Response to Final Office Action for U.S. Appl. No. 12/985,134, mailed Aug. 19, 2013.

Non-final Office Action mailed Mar. 1, 2013 in U.S. Appl. No. 12/985,134.

* cited by examiner

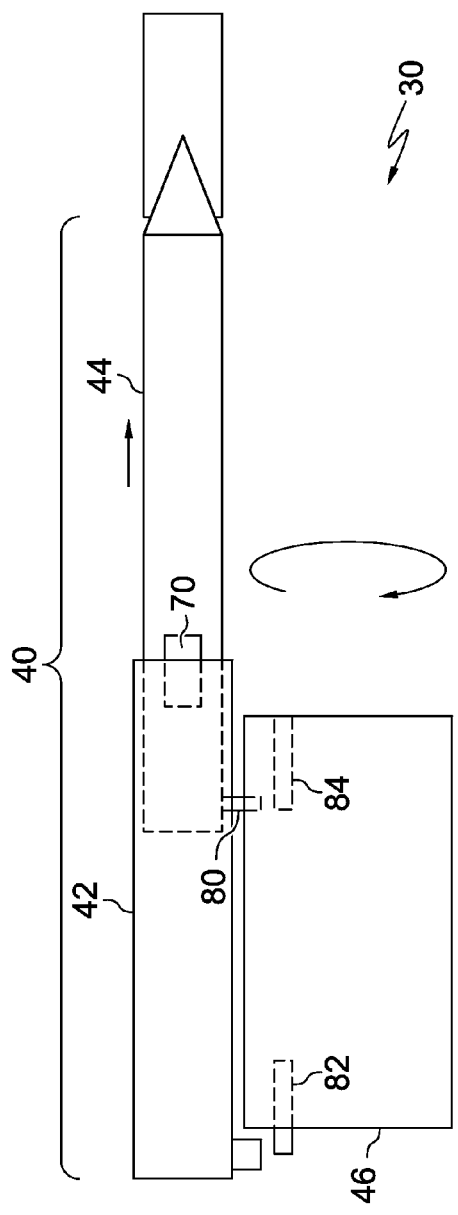
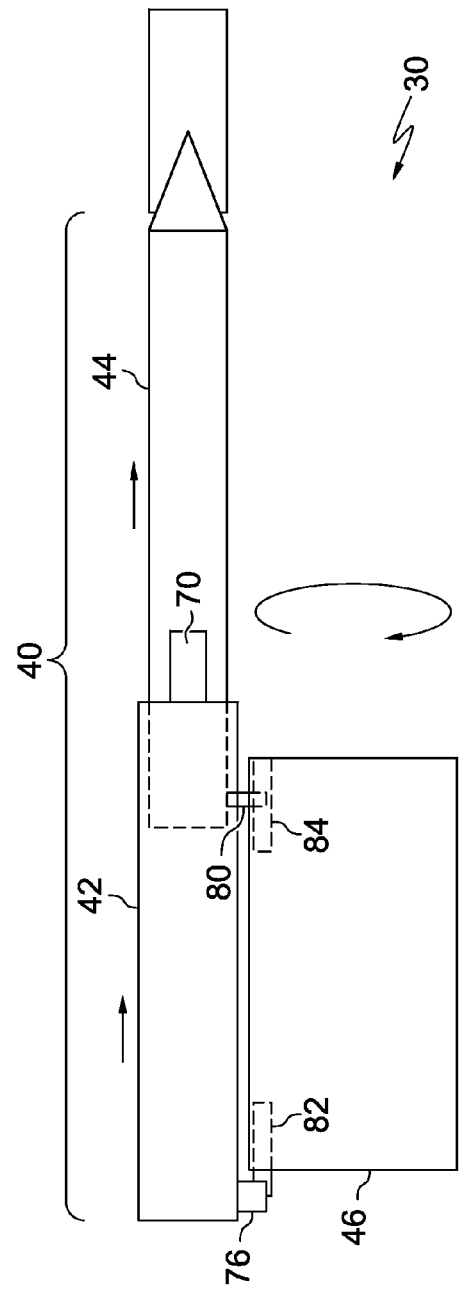
FIG.11
FIG.12

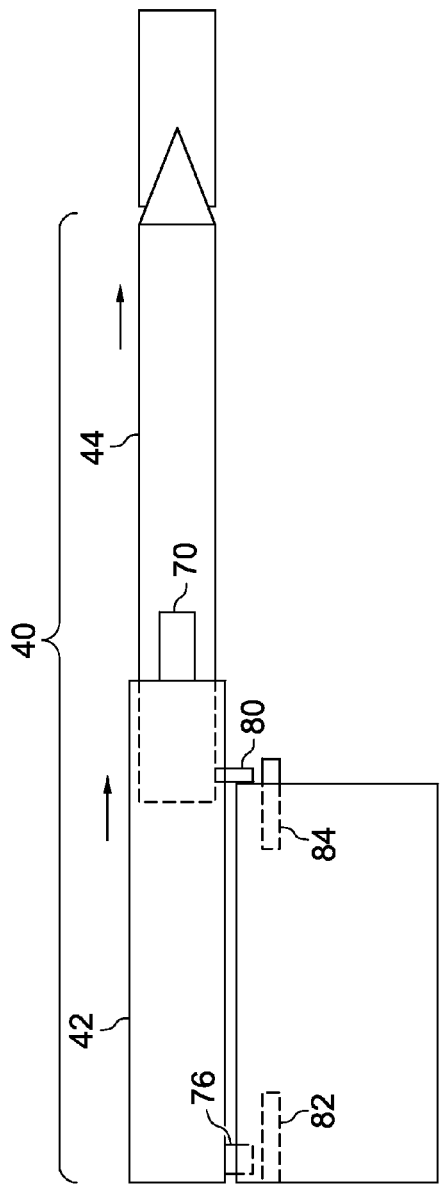
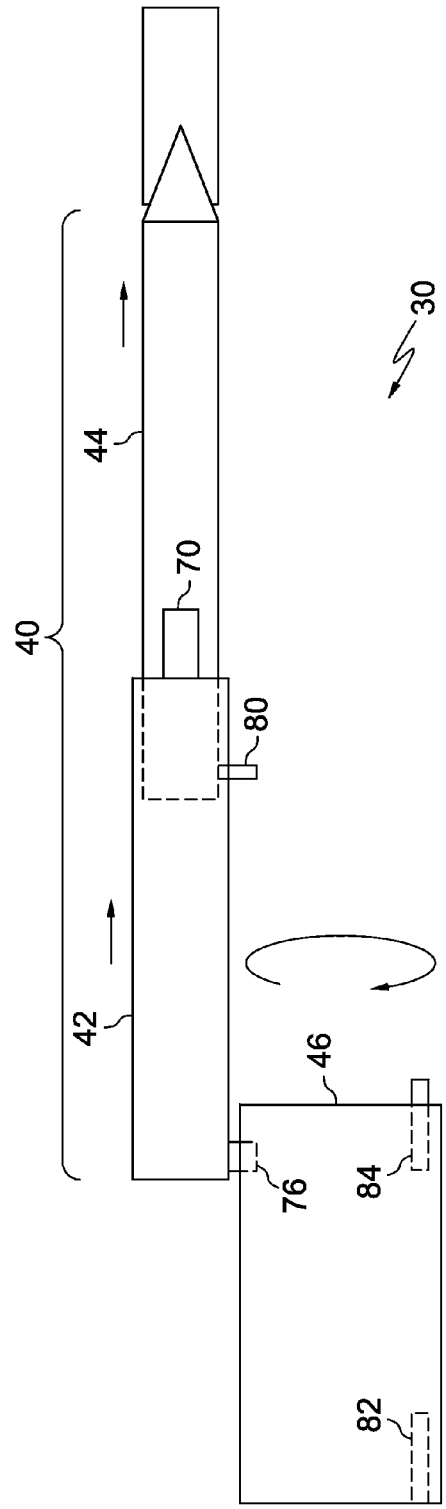
FIG.13
FIG.14

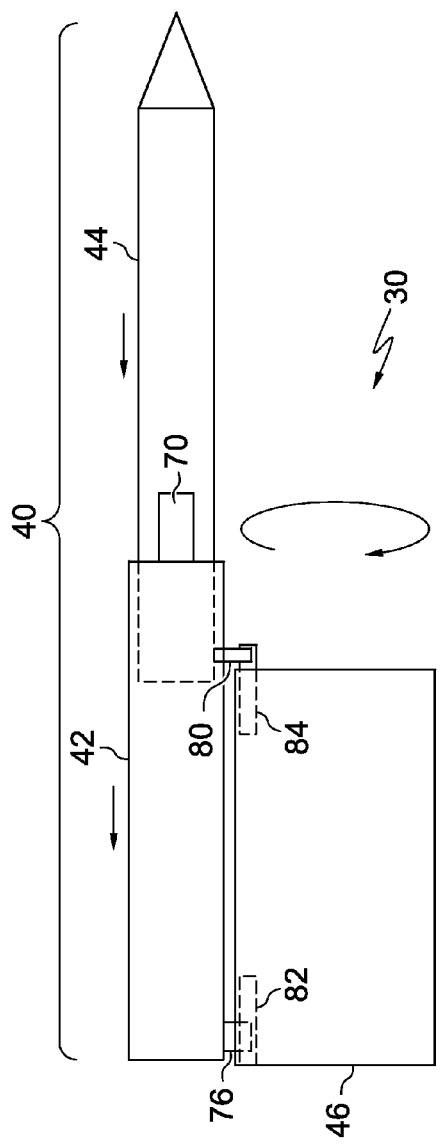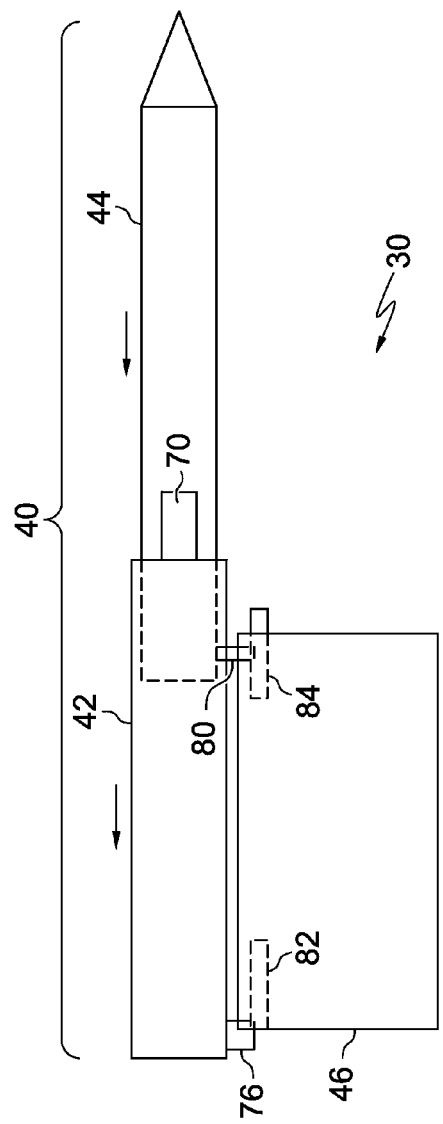

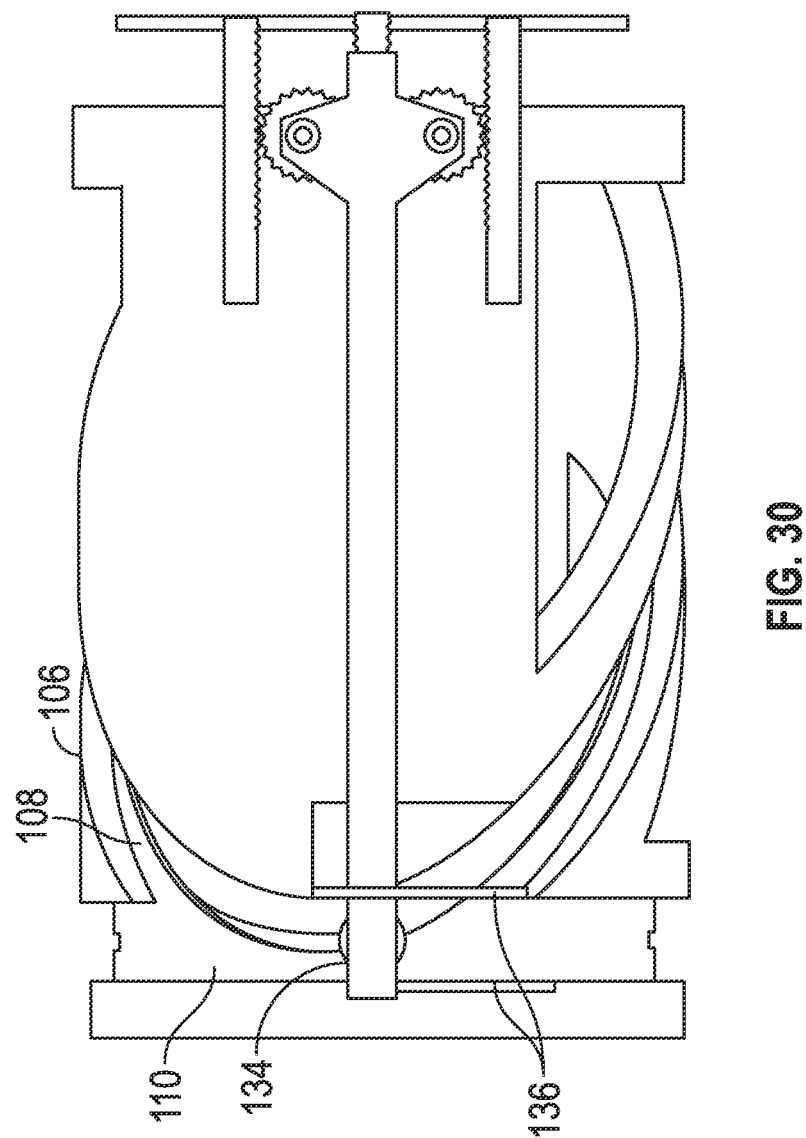

LOADING MACHINE FOR FEEDING A RECEIVER

CROSS-REFERENCE TO RELATED APPLICATIONS

This is continuation-in-part of co-pending U.S. patent application Ser. No. 12/985,134 filed Jan. 5, 2011, and entitled "Loading Machine For Feeding A Receiver", which is hereby incorporated herein by reference in its entirety.

TECHNICAL FIELD

The technical field generally relates to a loading machine and more particularly relates to a loading machine for feeding a receiver.

BACKGROUND

Loading machines are commonly used in operations where a receiver needs to be continuously fed with a payload. Loading machines may be used in a wide range of applications that utilize the continuous positioning of sequential payloads into or onto a receiver. For example, loading machines are commonly used in armaments to insert a series of bullet, rounds, shells, or any other type of munitions into the breech of a weapon.

Modern armaments include rail guns. A rail gun is an electrical gun that accelerates a conductive projectile along a pair of metal rails. To do this, rail guns pass a large electric current through the conductive projectile. It is desirable to avoid any electrical arcing between the rails and the conductive projectile, so the conductive projectile is typically positioned tightly between the two rails. Such tight positioning requires a relatively high insertion and/or extraction force, in some cases reaching up to several thousand pounds.

Additionally, rail guns typically utilize a relatively long conductor-free zone in the area located to the rear of the rails. This reduces the likelihood of arcing and other electrical and/or magnetic related complications. Accordingly, a loading machine used to position a conductive projectile into the breech of a rail gun would use a relatively long stroke to reach the breech. Also, the tactical implementation of a rail gun for defense applications requires adjustability in both azimuth and elevation for elevated and extended range targets. It is therefore desirable that a loading machine be compact to minimize interference with the elevation and azimuth adjustability of the rail gun. Additionally, as rail guns become increasingly capable of repeated and rapid firing, a loading machine will be needed that can keep pace with the rate of fire.

These specifications are not unique to rail guns. Rather, many different types of receivers have similar specifications. Accordingly, it is desirable to provide a compact loading machine having a relatively long stroke and a relatively high insertion/extraction force. In addition, it is desirable to provide a loading machine that is capable of rapidly and repeatedly loading and/or unloading a payload into a receiver. Furthermore, other desirable features and characteristics will become apparent from the subsequent detailed description and the appended claims, taken in conjunction with the accompanying drawings and the foregoing technical field and background.

BRIEF SUMMARY

Various exemplary embodiments of a loading machine for feeding a receiver is disclosed herein.

In a first exemplary embodiment, the loading machine includes, but is not limited to a drum cam that is configured to rotate. The drum cam has a cam path. The loading machine further includes, but is not limited to, a first track that is positioned proximate the drum cam. The loading machine further includes, but is not limited to, a rammer subassembly engaging the drum cam and the first track. The rammer subassembly is configured to move between an extended position and a retracted position as the drum cam rotates. The rammer subassembly includes, but is not limited to, a first rammer section that is engaged with the cam path and that is configured to move longitudinally during rotation of the drum cam. The first rammer section includes a first gear that is engaged with the first track such that longitudinal movement of the first rammer section causes rotation of the first gear. The rammer subassembly further includes, but is not limited to, a second rammer section that is telescopically coupled with the first rammer section and that is engaged with the first gear such that rotation of the first gear causes the second rammer section to telescopically move with respect to the first rammer section.

In another exemplary embodiment, the loading machine includes, but is not limited to, a drum cam that is configured to rotate. The drum cam has a first end, a second end, a first cam path, and a second cam path. The first cam path comprises a first loop around a periphery of the drum cam that extends substantially between the first end and the second end. The second cam path comprises a second loop around a circumference of the drum cam. The loading machine further includes, but is not limited to a first track positioned proximate the drum cam. The loading machine further includes, but is not limited to, a rammer subassembly that is engaged with the drum cam and the first track. The rammer subassembly is configured to alternately engage the first cam path and the second cam path. The rammer subassembly is configured to move between an extended position and a retracted position as the drum cam rotates when the rammer subassembly is engaged with the first cam path. The rammer subassembly is configured to remain in a retracted position as the drum cam rotates when the rammer subassembly is engaged with the second cam path. The rammer subassembly includes a first rammer section that is configured to alternately engage the first cam path and the second cam path. The first rammer section is configured to move longitudinally during rotation of the drum cam when the first rammer section is engaged with the first cam path. The first rammer section includes a first gear that is engaged with the first track such that longitudinal movement of the first rammer section causes rotation of the first gear. The first rammer section is further configured to remain substantially stationary during rotation of the drum cam when engaged with the second cam path. The rammer subassembly includes a second rammer section that is telescopically coupled with the first rammer section and that is engaged with the first gear such that rotation of the first gear causes the second rammer section to telescopically move with respect to the first rammer section.

In yet another embodiment, the loading machine includes, but is not limited to, a drum cam that is configured to rotate. The drum cam has a first end, a second end, a first cam path, and a second cam path. The first cam path comprises a first loop around a periphery of the drum cam and extends substantially between the first end and the second end. The second cam path comprises a second loop around a circumference of the drum cam. A first portion of the first cam path overlaps with a second portion of the second cam path. The loading machine further includes a first track that is positioned proximate the drum cam. The loading machine further includes a second track positioned proximate the drum cam. The loading machine further includes a rammer subassembly that is engaged with the drum cam, the first track, and the second track. The rammer subassembly is configured to alternately engage the first cam path and the second cam path. The rammer subassembly is configured to move between an extended position and a retracted position as the drum cam rotates when the rammer subassembly is engaged with the first cam path. The rammer subassembly is configured to remain in a retracted position as the drum cam rotates when the rammer subassembly is engaged with the second cam path. The rammer subassembly includes, but is not limited to, a first rammer section that is configured to alternately engage the first cam path and the second cam path. The first rammer section includes a first wing portion extending from a first lateral side of the first rammer section and a second wing portion extending from a second lateral side of the first rammer section. The first rammer section further includes a first gear rotationally mounted to the first wing portion, and a second gear rotationally mounted to the second wing portion. The first gear and the second gear are engaged with the first track and the second track, respectively such that longitudinal movement of the first rammer section causes rotation of the first gear and rotation of the second gear. The first rammer section is configured to move longitudinally during rotation of the drum cam when the first rammer section is engaged with the first cam path. The first rammer section is further configured to remain substantially stationary during rotation of the drum cam when the first rammer section is engaged with the second cam path. The rammer assembly further includes a second rammer section that is telescopically coupled with the first rammer section and that is engaged with the first gear and the second gear such that rotation of the first gear and rotation of the second gear causes the second rammer section to telescopically move with respect to the first rammer section.

BRIEF DESCRIPTION OF THE DRAWINGS

The present invention will hereinafter be described in conjunction with the following drawing figures, wherein like numerals denote like elements, and:

FIG. 11 is a schematic side view similar to FIG. 9 illustrating the inner member of the rammer subassembly in an extended position at the end of a range of travel with respect to an outer member of the rammer;

FIG. 12 is a schematic side view similar to FIG. 9 illustrating movement of the outer member of the rammer subassembly from a home position, engagement of the outer member of the rammer subassembly with the drum cam, and movement of the entire rammer subassembly from a receiving position towards a loading position;

FIG. 13 is a schematic side view similar to FIG. 9 illustrating disengagement of the inner member of the rammer subassembly from the drum cam and continued movement of the entire rammer subassembly towards the loading position;

FIG. 14 is a schematic side view similar to FIG. 9 illustrating the outer member of the rammer subassembly in a deployed position and the rammer subassembly in the loading position;

FIG. 15 is a schematic side view similar to FIG. 9 illustrating movement of the rammer subassembly towards the receiving position, movement of the outer member of the rammer subassembly towards the home position, and engagement of the inner member of the rammer assembly with the drum cam;

FIG. 16 is a schematic side view similar to FIG. 9 illustrating continued movement of the rammer subassembly towards the receiving position and disengagement of the outer member of the rammer subassembly from the drum cam;

FIG. 30 is a plan view similar to FIG. 29, illustrating the gate positioned to guide a cam follower onto a second cam path.

DETAILED DESCRIPTION

Figure 1:
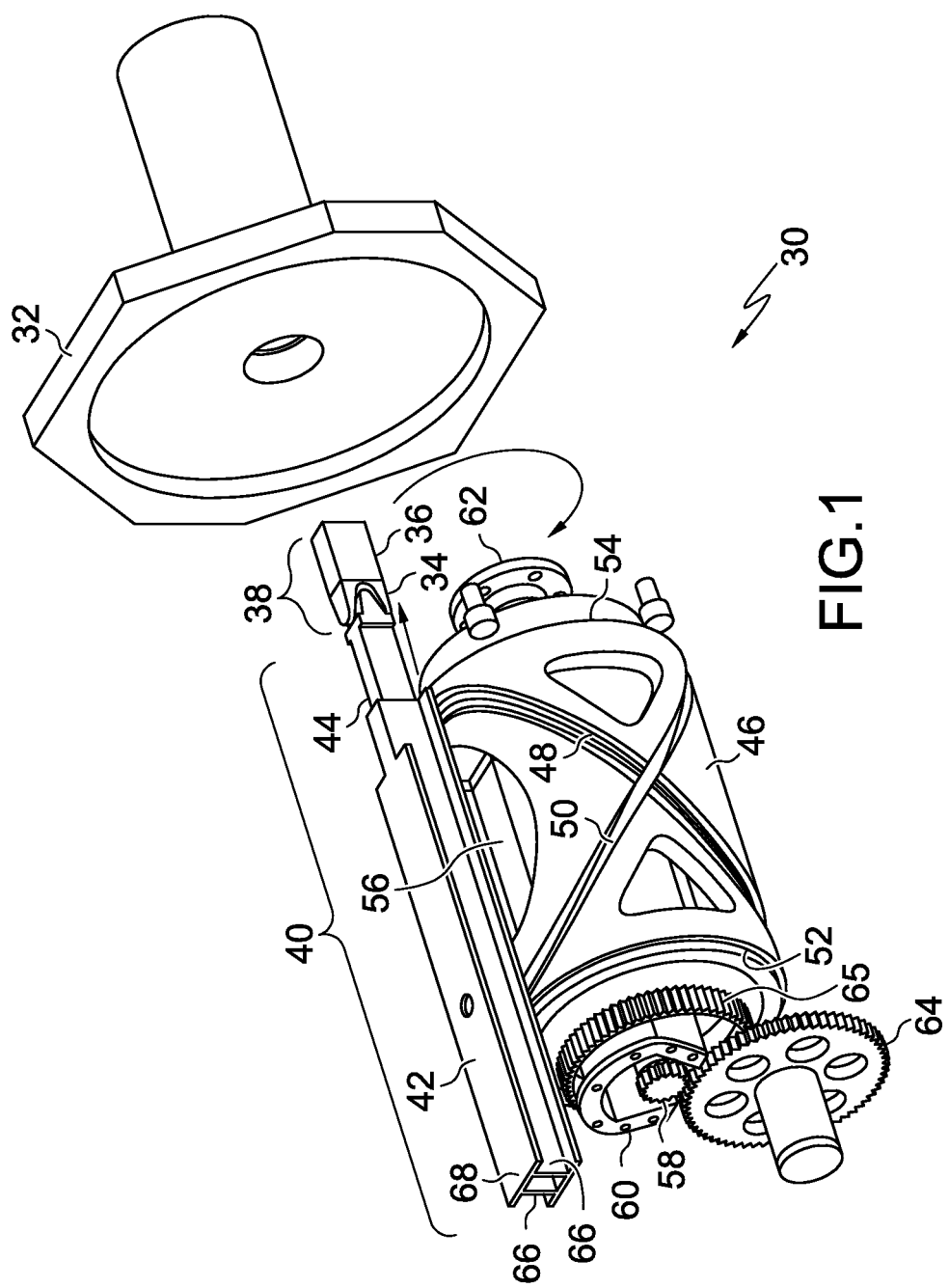
FIG. 1 is a perspective view of an embodiment of a loading machine having a rammer subassembly illustrated in a receiving position with a payload loaded onto the rammer.

The following detailed description is merely exemplary in nature and is not intended to limit application and uses. Furthermore, there is no intention to be bound by any theory presented in the preceding background or the following detailed description.

A loading machine suitable for at least substantially continuously feeding a receiver in accordance with a non-limiting embodiment. The improved loading machine includes a drum cam having two cam paths for engaging a two-member telescoping rammer. A motor resides within the drum cam and is configured to rotate the drum cam. When the drum cam rotates, each cam path engages a cam follower of a respective member of the rammer.

The first cam path is configured to cause the first member of the rammer subassembly to move back and forth longitudinally with respect to the drum cam between a home position and a deployed position when the drum cam rotates. Such movement of the first member from the home position to the deployed position moves the entire rammer subassembly towards the receiver. Movement of the first member from the deployed position to the home position moves the entire rammer assembly away from the receiver.

The second cam path is configured to cause the second member of the rammer subassembly to move longitudinally outwardly from the first member towards an extended position, and to then retract longitudinally inwardly with respect to first member when the drum cam rotates. Movement of the second member from the retracted position to the extended position moves the second member towards the receiver. Movement of the second member from the extended position to the retracted position moves the second member away from the receiver.

In an embodiment, the different members of the rammer subassembly will move in sequence. In an exemplary cycle, starting from the receiving position where the first member is in the home position and the second member is in the retracted position, the second member will move with respect to the first member from a retracted position to an extended position. The second member will then lock in place with respect to the first member. Next, the first member will move from a home position to a deployed position. Because of a locked relationship with the first member, the second member will move together with the first member as the first member moves back and forth between a home position and a deployed position. Once the first member reaches the deployed position, the rammer assembly is in the loading position where the payload is delivered to the receiver. Next, the first member will return from a deployed position back to a home position. Finally, the second member will unlock with respect to the first member and retract back within the first member. This sequence will repeat as long as the drum cam is rotating. In this manner, continuous rotation of the drum cam will cause the rammer subassembly to move back and forth between a receiving position, where a payload item may be positioned on the rammer, and a loading position, where the payload item is delivered to the receiver. Upon a return to the receiving position, the rammer subassembly is ready to receive a new payload item.

In another non-limiting embodiment, a loading machine utilizes a single cam path to extend and retract a rammer subassembly. The cam path loops around a periphery of the drum path and extends between opposite longitudinal ends of the drum cam. The rammer subassembly includes a multi-section telescoping rammer. In an embodiment, the multi-section telescoping rammer has a first rammer section and a second rammer section that is in sliding engagement with the first rammer section and is configured to collapse into, and extend out of, the first rammer section.

In an embodiment, the first rammer section includes a cam follower to engage the cam path and further includes a gear to engage a stationary track that is positioned proximate the rammer subassembly. As the first rammer section is driven forward by the spinning drum cam, the gear will rotate due to engagement with the track. The second rammer section is engaged with the gear and as the gear rotates, the gear will drive the second rammer section forward in a longitudinal direction with respect to the first rammer section. Thus, as the first rammer section moves forward with respect to the drum cam, the second rammer section moves forward with respect to the first rammer section.

When the cam follower reaches the longitudinal end of the cam path, the rammer subassembly is in a fully extended position. When the rammer subassembly is in the fully extended position, the payload is deposited into the receiver (e.g., a projectile is seated into the breech of a rail gun).

As the drum cam continues to spin, the cam path will turn back in the opposite direction and will pull the first rammer section back towards the opposite longitudinal end of the drum cam. As the first rammer section moves back towards the drum cam, the gear will rotate in the opposite direction which, in turn, will drive the second rammer section in the opposite direction, causing the second rammer section to retract into the first rammer section. When the cam follower reaches the opposite end of the cam path, the rammer subassembly is in a retracted position and a new payload may be positioned in front of the rammer subassembly for loading into the receiver.

Use of a telescoping, two-member rammer subassembly permits the loading machine to have a compact design relative to the length of a stroke. Mounting the motor for the drum cam internally within the drum cam further contributes to the overall compactness of the loading machine. By adjusting the speed of the motor, the loading machine can accommodate any desired rate of payload delivery. The configuration of the cam paths, the strength of the motor, and the robustness of the rammer subassembly may be adjusted and/or configured to provide substantially any desired amount of loading and/unloading force.

A greater understanding of the embodiments of the loading machine for feeding a receiver may be obtained through a review of the illustrations accompanying this application together with a review of the detailed description that follows.

FIG. 1 is a perspective view of an embodiment of a loading machine 30 for feeding a receiver 32. In the illustrated embodiment, receiver 32 is representative of the rear portion and the breech of an electromagnetic rail gun. Loading machine 30 is configured to deliver to receiver 32 both a conductive armament 34 and a projectile 36, which together comprise payload 38. It should be understood that the depiction herein of an electromagnetic rail gun and the depiction herein of a payload compatible with the electromagnetic rail gun is for illustrative purposes only and is not intended to be limiting in anyway. It should be further understood that loading machine 30 is not limited to use with electromagnetic rail guns, but rather, is compatible with any sort, type and/or variety of receiver that is configured to receive a continuous payload feed.

Loading machine 30 includes a rammer subassembly 40 that is configured to deliver payload 38 to receiver 32. Rammer subassembly 40 includes a first member 42 and a second member 44. First member 42 and second member 44 are telescopically engaged with one another. In the illustrated embodiment, second member 44 is dimensioned and configured to nest within first member 42, and to slide inwardly and outwardly with respect to first member 42. In other embodiments, this relationship may be reversed and first member 42 may be configured to fit within, and to slide inwardly and outwardly with respect to, second member 44. In still other embodiments, rammer subassembly 40 may include more than two telescopically engaged members. In the illustrated embodiment, first member 42 and second member 44 each have generally rectangular cross-sections. In other embodiments, first member 42 and second member 44 may have any suitable or desired cross-sectional configuration, including, but not limited to, circular and triangular configurations. First member 42 and second member 44 may be made from any suitable material including, but not limited to, wood, metal, and polymeric materials.

Loading machine 30 also includes a drum cam 46. Drum cams are well known in the art and typically comprise a cylindrical body open at both longitudinal ends. A cam path is commonly defined in a surface of the drum cam. The cam path is commonly configured to move an engaging member linearly when the drum cam is rotating. Drum cam 46 may be made from any suitable material including, but not limited to, metal, wood, and polymeric materials. In the illustrated embodiment, drum cam 46 includes a first cam path 48 and a second cam path 50. Each cam path is defined in an external peripheral surface of drum cam 46, each can path extends circumferentially around drum cam 46, and each cam path extends from proximate a first longitudinal end 52 of drum cam 46 to proximate a second longitudinal end 54 of drum cam 46. First cam path 48 intersects second cam path 50 at two locations. One such intersection is visible in FIG. 1, and the other intersection (not shown) is disposed on an opposite side of drum cam 46. In other embodiments, first cam path 48 and second cam path 50 may be defined on an internal circumferential surface of drum cam 46. In still other embodiments, first cam path 48 and second cam path 50 may extend in multiple revolutions around a periphery of drum cam 46 and may have a corresponding number of intersections. Still other configurations are possible without departing from the teachings of the present disclosure.

First member 42 includes a cam follower, which is not shown in FIG. 1, which is configured to engage with first cam path 48. Second member 44 includes a cam follower that is configured to engage second cam path 50. The cam follower on second member 44 protrudes through a slot defined in a bottom surface of first member 42 and is thus enabled to engage second cam path 50 while telescopically engaged with first member 42. As drum cam 46 rotates about a longitudinal axis, first and second cam paths 48 and 50 engage the cam followers on first and second members 42 and 44, respectively, to move first and second members 42 and 44 back and forth longitudinally with respect to drum cam 46 and with respect to each other, as described in greater detail below.

In the illustrated embodiment, first member 42 also includes a pair of channels 66 disposed on the lateral sides of first member 42 and extending longitudinally along substantially the entire length of first member 42. Channels 66 are configured to cooperate with rollers, braces, and/or other support structures, which are not shown, that may be mounted to the housing or other portions of loading machine 30 and that are configured to support first member 42 against twisting forces that might result from the engagement between a cam follower and first cam path 48 when drum cam 46 rotates.

Loading machine 30 also includes a motor 56. Motor 56 is configured to impart torque to an output shaft 58. Motors are well known in the art and motor 56 may be any type of motor suitable for generating rotational motion or torque, including, but not limited to, an electric motor and/or an internal combustion motor. Motor 56 is dimensioned to fit within a cavity formed by the cylindrical configuration of drum cam 46. A first motor mount 60 and a second motor mount 62 are used to mount motor 56 to a housing of loading machine 30, which is not shown. In the illustrated embodiment, first and second motor mounts 60 and 62 protrude through openings at first longitudinal end 52 and second longitudinal end 54, respectively, of drum cam 46. First motor mount 60 has an open configuration to permit output shaft 58 to protrude through first longitudinal end 52 of drum cam 46. A gear cluster 64 is mounted to the housing of loading machine 30 and is configured to transmit torque from output shaft 58 to drum cam 46. Drum cam 46 includes a drive gear 65 positioned proximate first longitudinal end 52 and extending peripherally around drum cam 46. First motor mount 60 extends through drive gear 65. Drive gear 65 is configured to engage gear cluster 64 and gear cluster 64 transmits torque to drive gear 65 to rotate drum cam 46 about a longitudinal axis. Rollers, which are not shown in FIG. 1, are mounted to motor 56 and elsewhere that allow motor 56 to serve as a spindle that supports drum cam 46 as it rotates about a longitudinal axis. Arranging output shaft 58, gear cluster 64, and drive gear 65 in close proximity to one another contributes to the compact configuration of loading machine 30.

In FIG. 1, rammer subassembly 40 is disposed in a receiving position. While rammer subassembly 40 is in the receiving position, first member 42 is in a home position and second member 44 is in a retracted position. When first member 42 is disposed in a home position, a rear end 68 of first member 42 is disposed proximate first longitudinal end 52 of drum cam 46. When second member 44 is disposed in a retracted position, it is nested within first member 42. While in the receiving position, the cam follower on first member 42 is disposed outside of first cam path 48 and the cam follower on second member 44 is disposed within second cam path 50. When in the receiving position, rammer subassembly 40 is in a most compact state, ready to receive a payload.

Figure 2:
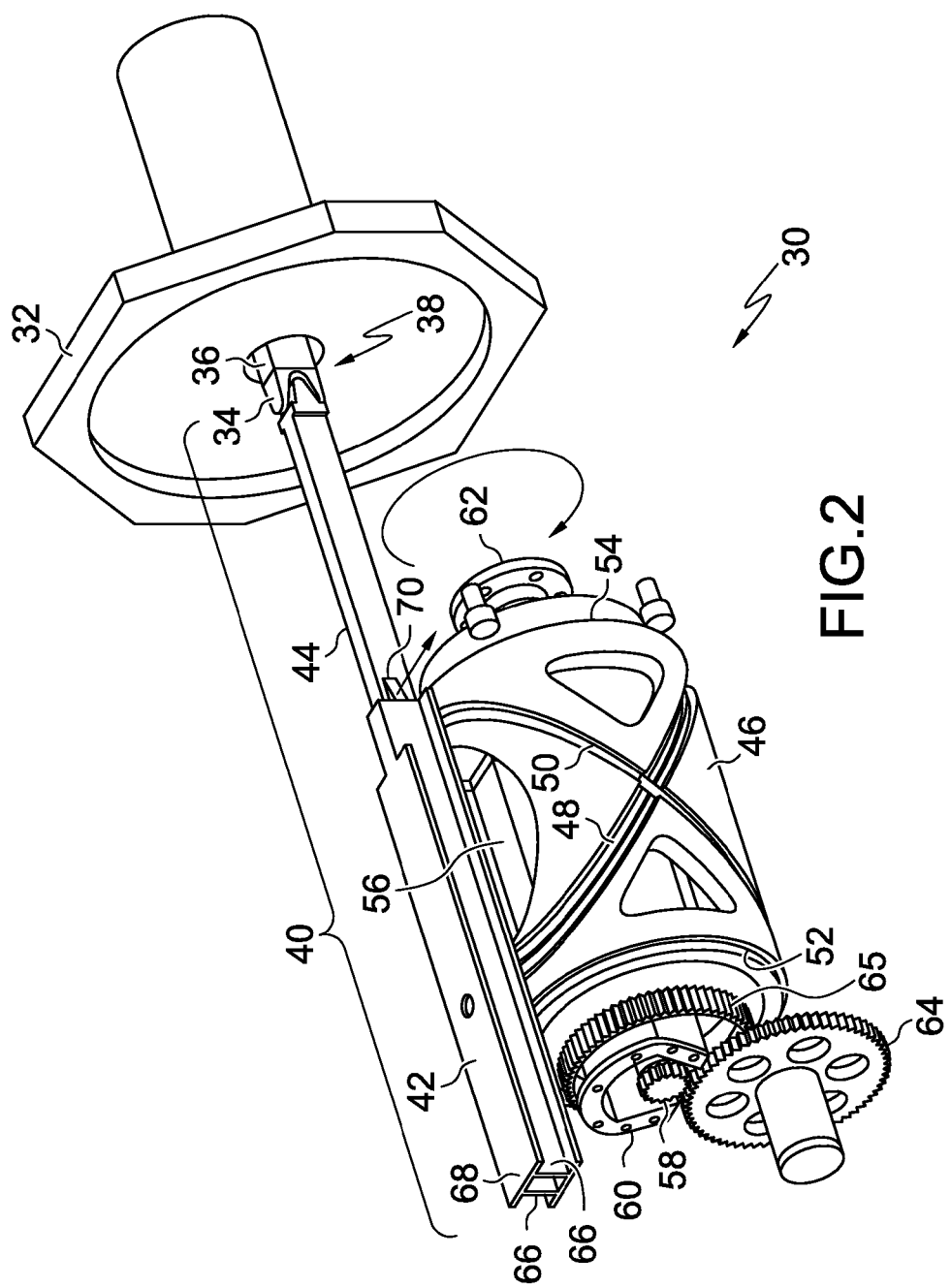
FIG. 2 is a perspective view illustrating the loading machine of FIG. 1 as the rammer subassembly extends towards a loading position which, in turn, moves the payload towards a receiver.

FIG. 2 illustrates loading machine 30 after drum cam 46 has begun rotating, which causes rammer subassembly 40 to begin moving towards a loading position. In the illustrated embodiment, drum cam 46 has rotated approximately 180° in the clockwise direction from the position it occupied in FIG. 1. This 180° rotation of drum cam 46 causes second cam path 50 to engage the cam follower on second member 44 and to move second member 44 to a extended position. Movement of second member 44 with respect to first member 42 is limited by a slot defined in the bottom surface of first member 42. When second member 44 reaches the end of the slot, second member 44 will begin to pull first member 42 towards receiver 32. This, in turn causes the cam follower on first member 42 to engage first cam path 48. Additionally, once second member 44 reaches the end of the slot, blocking member 70 moves from a recessed position to blocking position to prevent second member 44 from retracting back into first member 42. This allows a driving force applied by first member 42 to be transmitted through second member 44 to payload 38.

Figure 3:
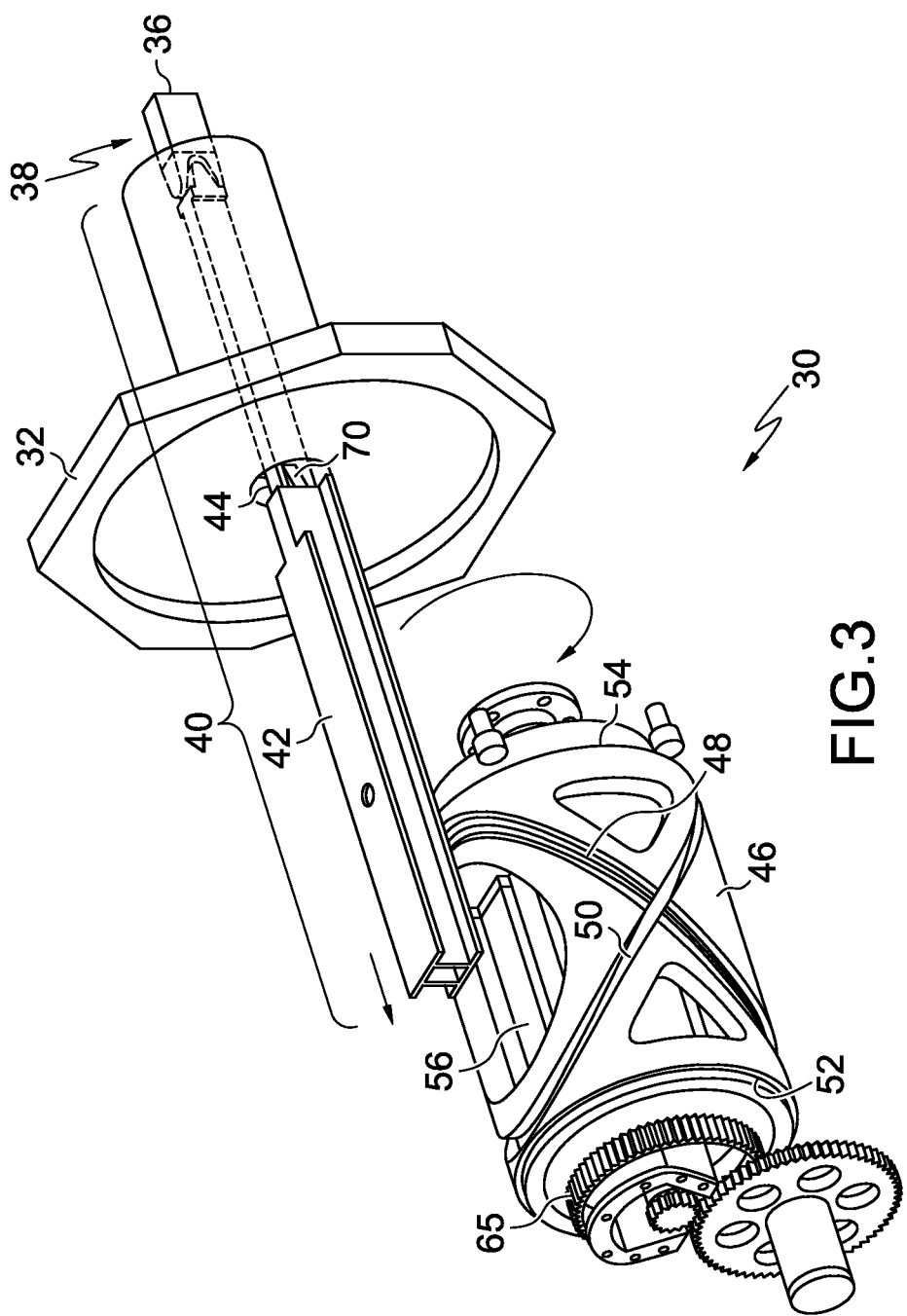
FIG. 3 is a perspective view illustrating the loading machine of FIG. 1 with the rammer subassembly in a loading position that loads the payload into the receiver.

FIG. 3 illustrates loading machine 30 after drum cam 46 has rotated an additional approximately 180° in the clockwise direction from the position it occupied in FIG. 2. This second 180° rotation has caused first member 42 to move to a deployed position where the rear end 68 of first member 42 is disposed proximate second longitudinal end 54 of drum cam 46. When first member 42 is in the deployed position, rammer subassembly 40 is in a loading position. The movement of first member 42 to a deployed position causes second member 44 to enter receiver 32 and deliver payload 38. In some embodiments, the highest amount of resistance to forward movement, which is movement towards receiver 32, encountered by rammer subassembly 40 will be encountered during this second 180° rotation. This is at least partially due to the second member 44 enters receiver 32 during the second rotation. Using techniques well known in the art, it is possible to configure the portion of first cam path 48 that engages the cam follower on first member 42 during this stage to provide the mechanical advantage needed to overcome any anticipated resistance.

Figure 4:
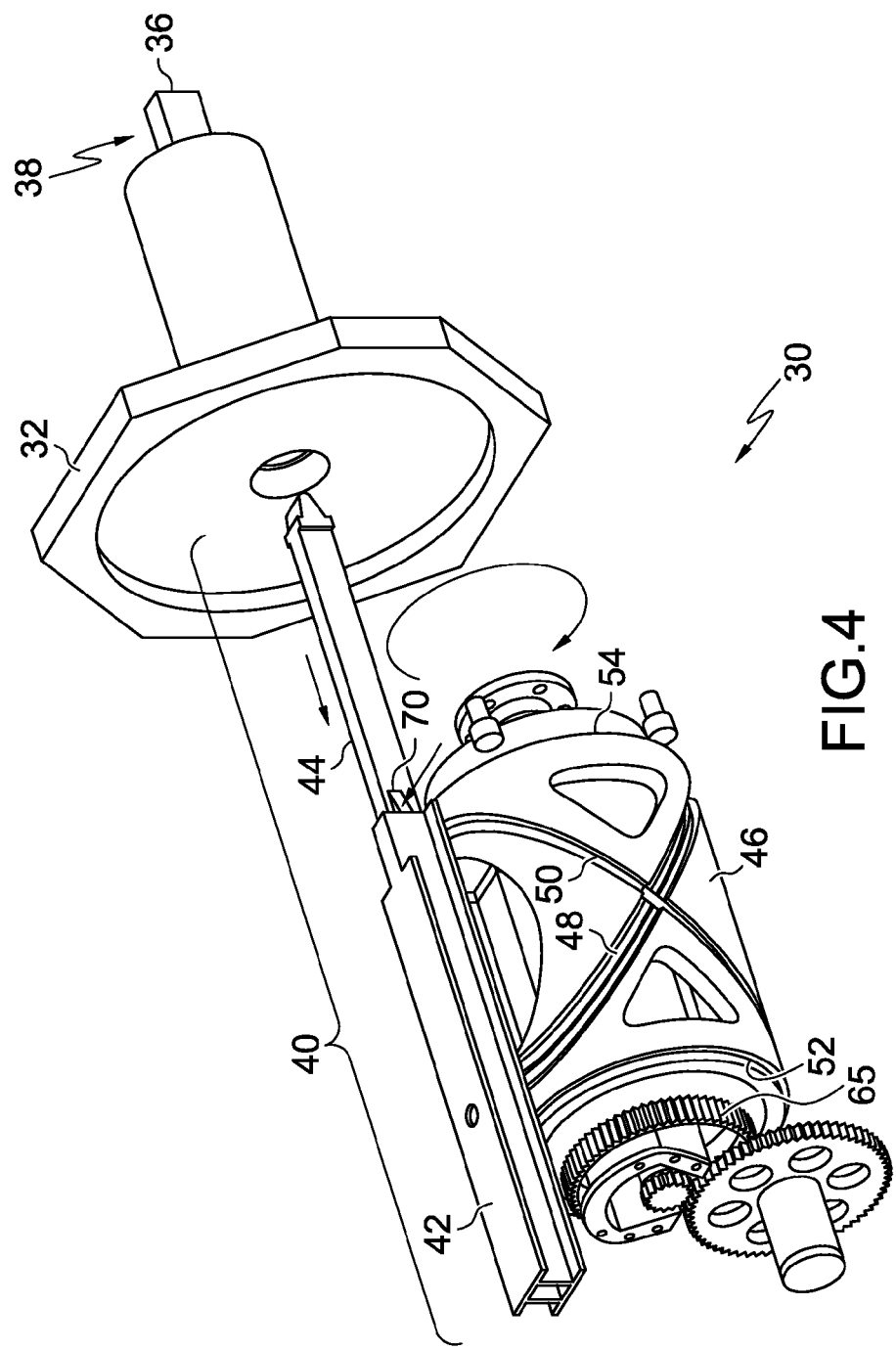
FIG. 4 is a perspective view illustrating the loading machine of FIG. 1 as the rammer subassembly retracts towards the receiving position, leaving the payload in the receiver.

FIG. 4 illustrates loading machine 30 after drum cam 46 has rotated a further approximately 180° in the clockwise direction from the position it occupied in FIG. 3. This third 180° rotation results in first member 42 moving back to a home position and the rear end 68 of first member 42 is disposed proximate first longitudinal end 52 of drum cam 46. The movement of first member 42 to a home position causes the cam follower on second member 44 to reengage second cam path 50 and the cam follower on first member 42 to disengage from first cam path 48. At the same time, blocking member 70 returns to a recessed position, and thus permits second member 44 to retract within first member 42. At this point in the cycle, payload 38 remains with receiver 32. In some embodiments, loading machine 30 may be configured to extract payload 38 from receiver 32 rather than to load payload 38 into receiver 32. In such embodiments, the maximum resistance to movement that first member 42 will experience would be encountered during this third 180° rotation. As stated above, a corresponding portion of first cam path 48 can be configured to provide the mechanical advantage necessary to overcome the resistance encountered.

Figure 5:
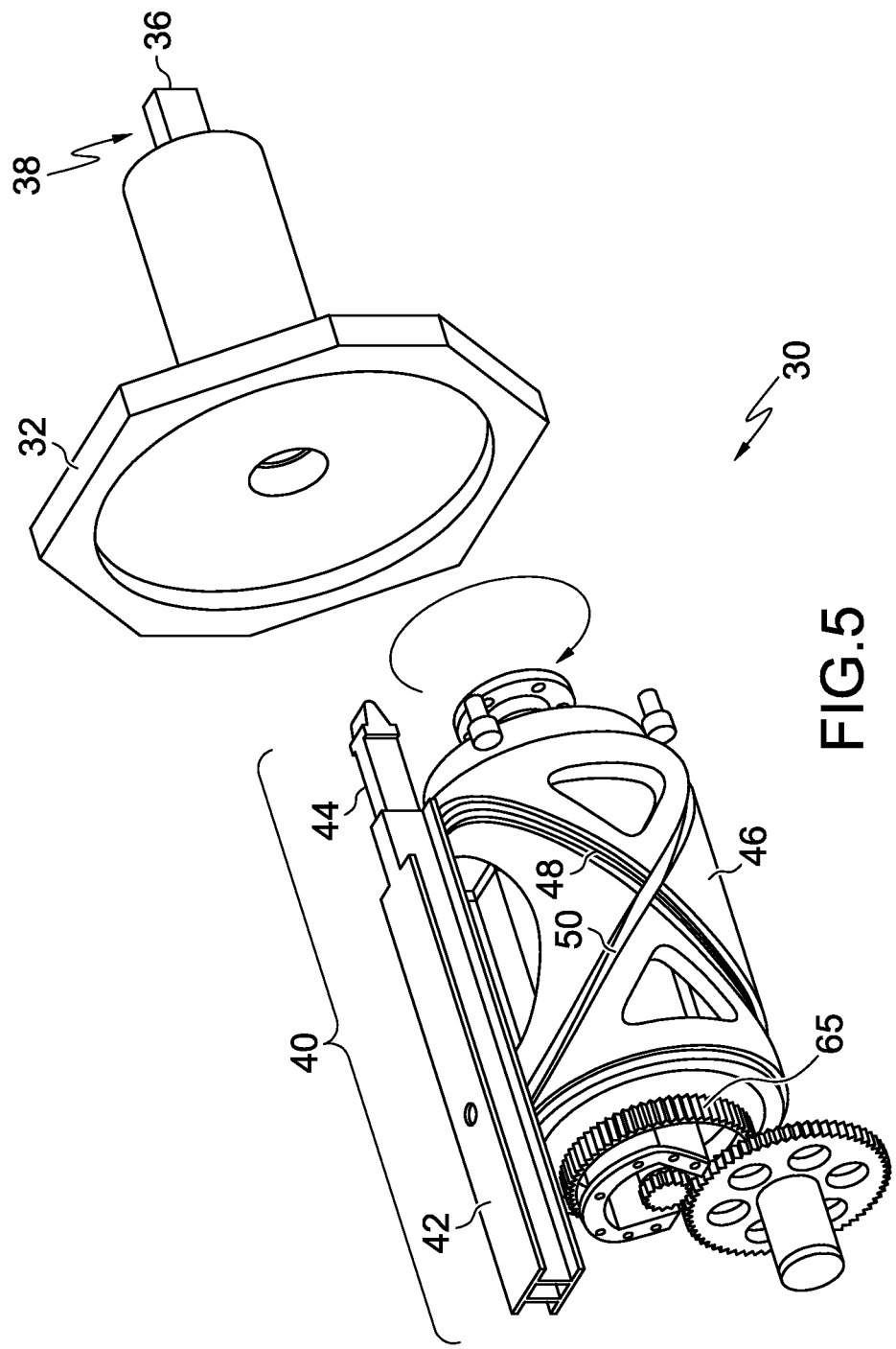
FIG. 5 is a perspective view illustrating the loading machine of FIG. 1 with the rammer subassembly retracted to the receiving position and ready to receive the next payload.

FIG. 5 illustrates loading machine 30 after drum cam 46 has rotated yet another approximately 180° in the clockwise direction from the position occupied in FIG. 4. This fourth 180° rotation has caused second member 44 to return to a retracted position, nested within first member 42. Rammer subassembly 40 is returned to a receiving position and is ready to receive the next payload.

Figure 6:
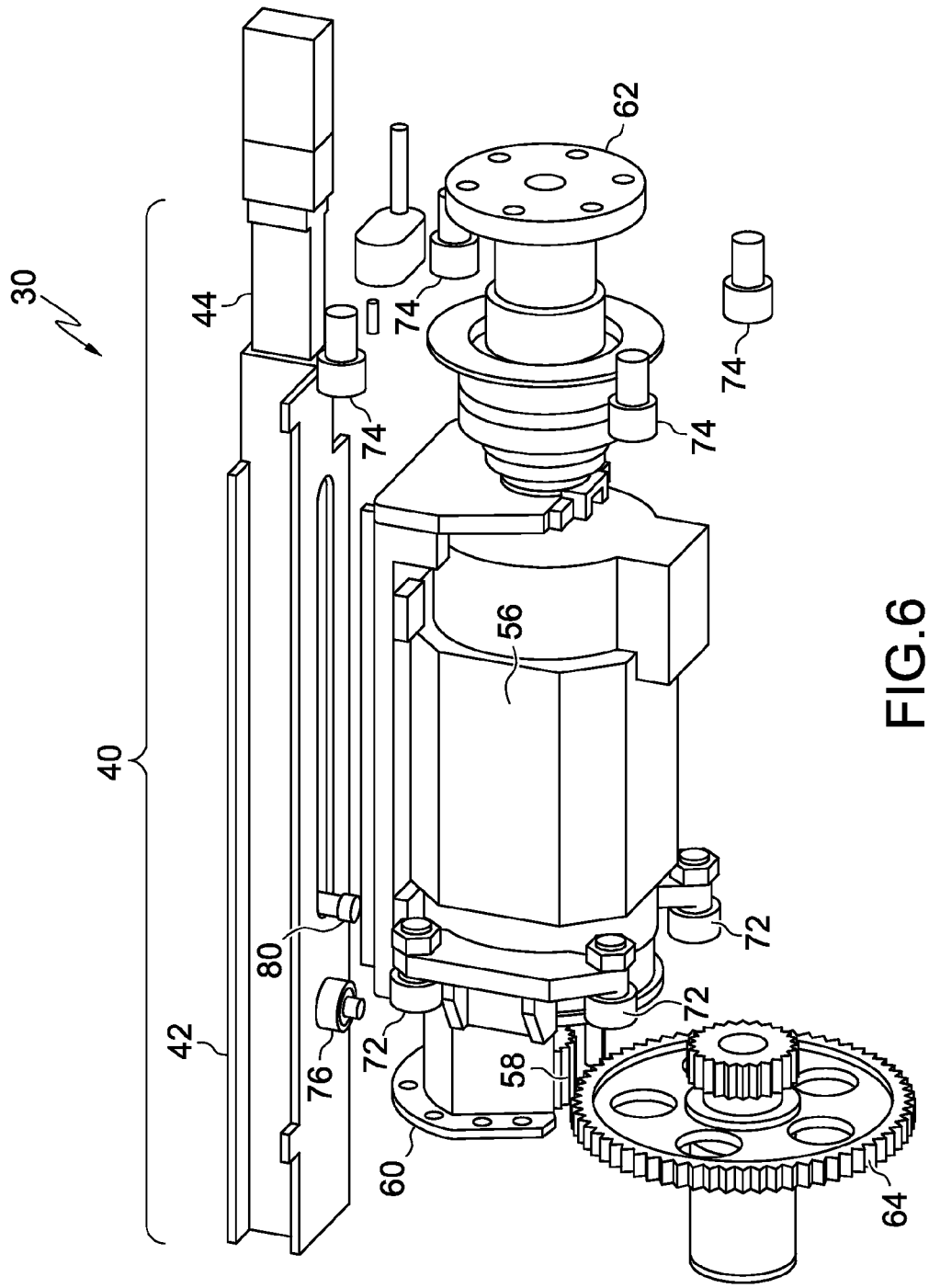
FIG. 6 is a perspective view illustrating the loading machine of FIG. 1 without the drum cam to expose internal components of the loading machine.

FIG. 6 is a perspective view illustrating loading machine 30 with the drum cam removed to expose various internal components. In the illustrated embodiment, four motor-mounted drum cam rollers 72, only 3 of which are visible in FIG. 6, are mounted to the assembly to support the drum cam. Rollers 72 as well as the motor 56 are attached directly to first motor mount 60. Configuring first motor mount 60 to reach through a drive gear allows for passing output shaft 58 out of the drum cam as previously described. Combining first motor mount 60 with second motor mount 62 allows the drum to be supported by an axle at only one end, which enables the placement of the motor within the drum. With continuing reference to FIG. 1 through FIG. 6, motor-mounted drum cam rollers 72 are positioned to support drum cam 46 proximate first longitudinal end 52. An additional four drum cam rollers 74 are positioned to support second longitudinal end 54 and are configured to be mounted to a housing or other portion of loading machine 30. Motor-mounted drum cam rollers 72 and drum cam rollers 74 cooperate to support drum cam 46 as drum cam 46 rotates.

A first cam follower 76 is mounted to a bottom surface of first member 42. A slot 78 is defined in the bottom surface of first member 42 and a second cam follower 80, mounted to a bottom surface of second member 44, protrudes through slot 78. As described above, slot 78 limits the longitudinal movement of second member 44 with respect to first member 42. In the illustrated embodiment, first and second cam followers 76 and 80 are rollers that are configured to have rolling engagement with their respective cam paths. In other embodiments, first and second cam path followers may take any suitable form effective to impart linear motion to first and second members 42 and 44 when engaging the first and second cam paths 48 and 50, respectively.

Figure 7:
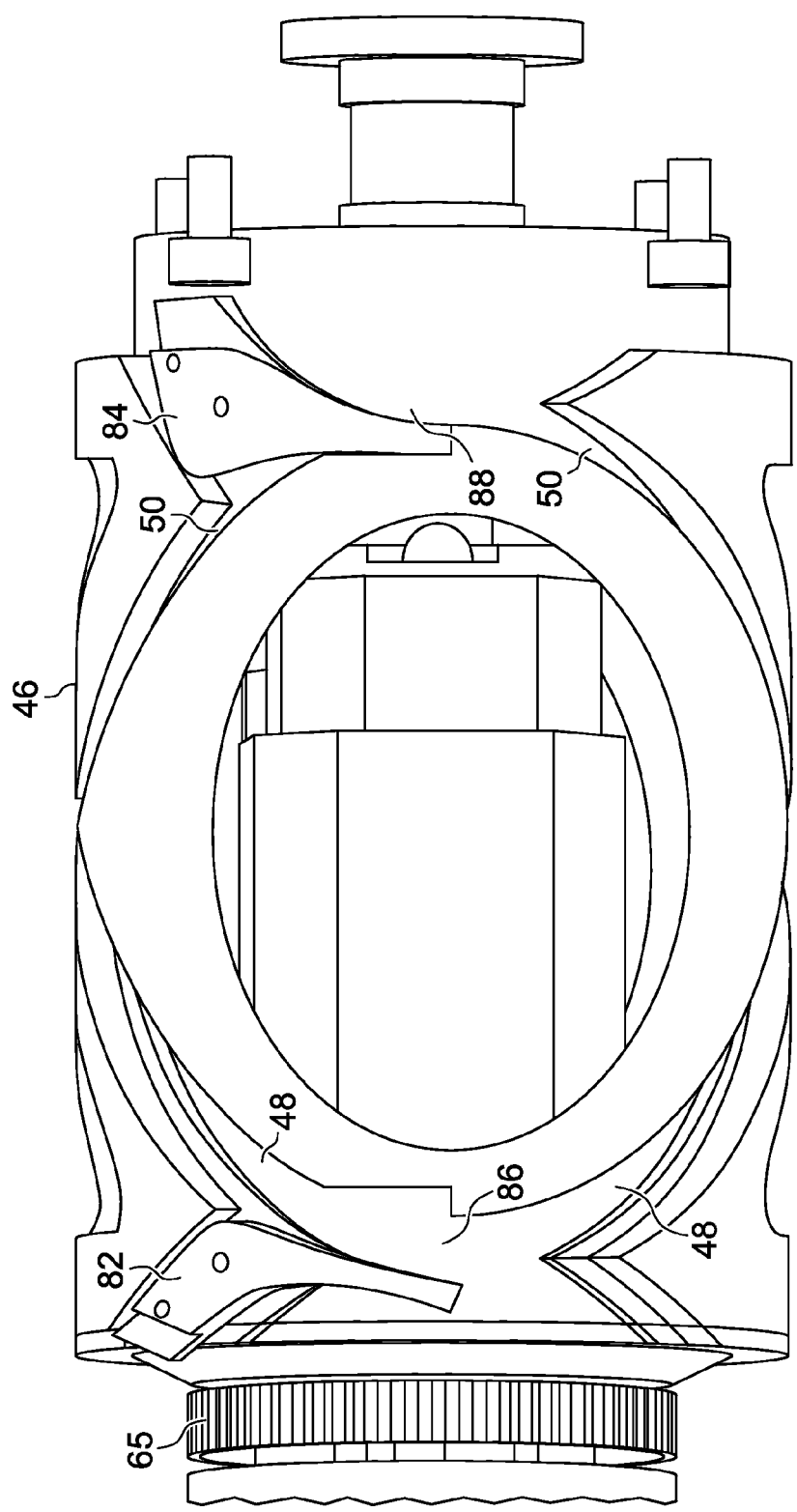
FIG. 7 is a perspective view illustrating a portion of the drum cam including cam paths and movable gates for controlling ingress and egress from the cam paths.

FIG. 7 is a perspective view illustrating a portion of drum cam 46 including first and second cam paths 40 and 50 as well as a first gate 82 and a second gate 84 for controlling ingress and egress from first and second cam paths 48 and 50, respectively. As illustrated, first cam path 48 has a first opening 86 proximate first longitudinal end 52 of drum cam 46 and second cam path 50 has a second opening 88 proximate second longitudinal end 54 of drum cam 46. First and second gate 82 and 84 are configured to control the ingress and egress of cam followers through these openings. First and second gates 82 and 84 are each configured to move between an ingress position and an egress position. When a gate is in an ingress position, the gate is positioned to guide a cam follower onto a respective cam path. Conversely, when the gate is in an egress position, the gate is configured to guide a cam follower off of a respective cam path.

FIG. 7 illustrates first gate 82 in an ingress position and second gate 84 in an egress position. With continuing reference to FIG. 1 through FIG. 7, when first and second gates 82 and 84 are in the configuration illustrated in FIG. 7, first cam follower 76 will be guided onto drum cam 46 and will become engaged with first cam path 48 as drum cam 46 rotates. At the same time, second cam follower 80 will be guided off of drum cam 46 and will become disengaged from second cam path 50. Once first and second cam followers 76 and 80 pass through first and second gates 82 and 84, respectively, first and second gates 82 and 84 will change positions, first gate 82 move into an egress position and second gate 84 moving to an ingress position.

Figure 8:
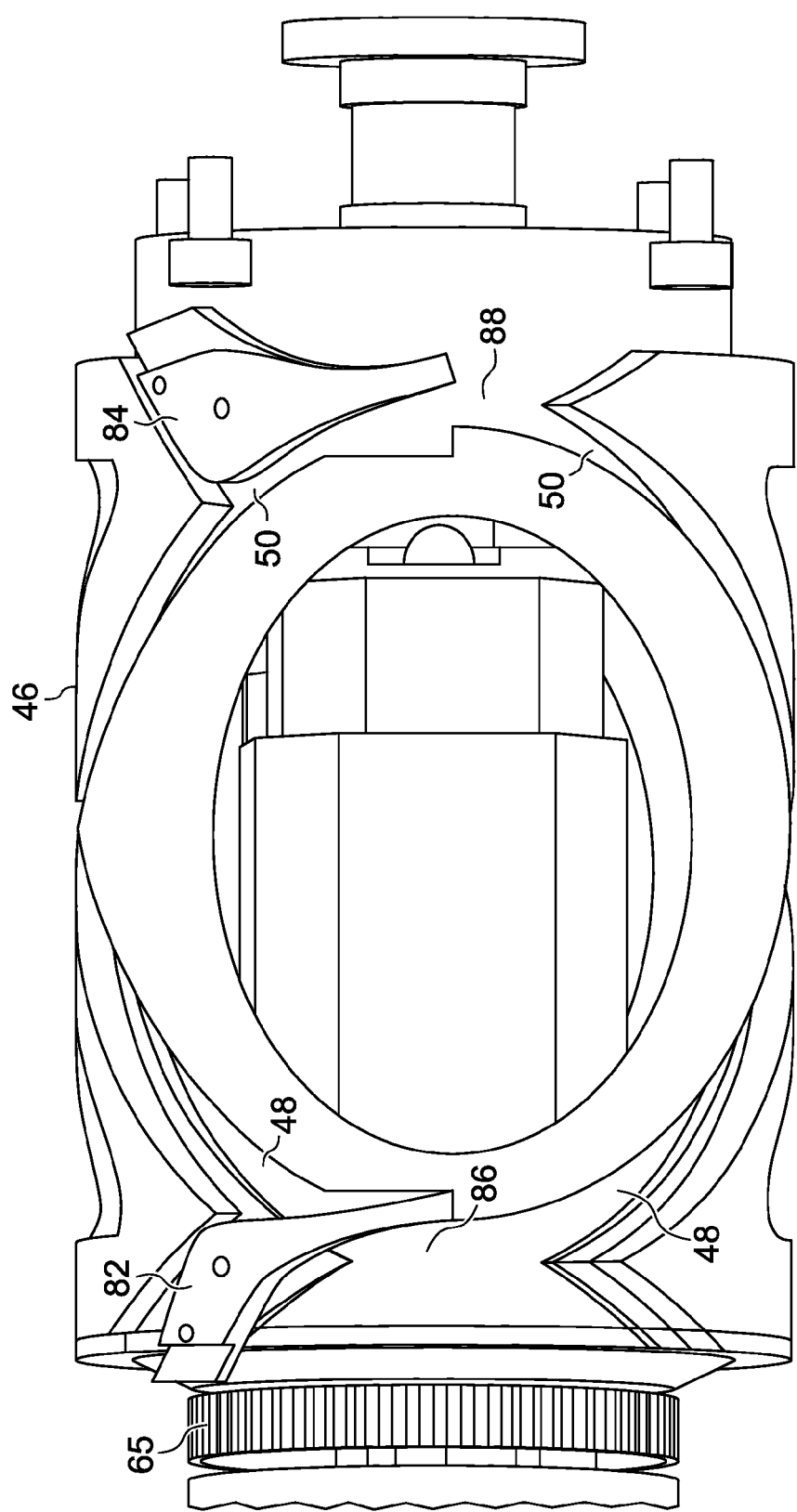
FIG. 8 is a perspective view similar to the view depicted in FIG. 7, the gates having moved to different positions.

FIG. 8 is a perspective view similar to the view depicted in FIG. 7, illustrating first and second gates 82 and 84 in their egress and ingress positions, respectively. With continuing reference to FIG. 1 through FIG. 8, when first and second gates 82 and 84 are positioned as illustrated in FIG. 8, first gate 82 will guide first cam follower 76 off of drum cam 46 and out of engagement with first cam path 48 and second gates 84 will guide second cam follower 80 onto drum cam 46 and into engagement with second cam path 50. As before, once first and second cam followers 76 and 80 pass through first and second gates 82 and 84, respectively, first and second gates 82 and 84 will move back to their ingress and egress positions, respectively.

A typical cycle with rammer subassembly 40 moving from a receiving position to a loading position and back again will now be described in detail with respect to FIG. 9 through FIG. 18. Throughout this description, continuing reference will be made to FIG. 1 through FIG. 8.

Figure 9:
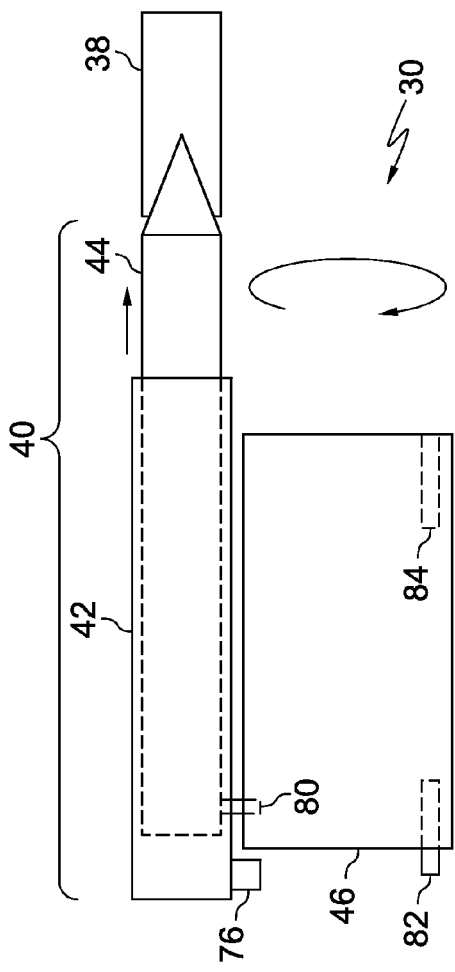
FIG. 9 is a schematic side view illustrating an embodiment of the loading machine with the rammer subassembly positioned in the receiving position and a payload positioned on the rammer.

FIG. 9 is a schematic side view illustrating loading machine 30 with rammer subassembly 40 positioned in a receiving position and with payload 38 mounted to the rammer FIG. 9 depicts second member 44 nested within first member 42, as indicated by the portion of second member 44 illustrated in phantom. First cam follower 76 is positioned to the left of drum cam 46, disengaged from first cam path 48, which is not shown in FIG. 9, and second cam follower 80 is positioned within second cam path 50, which is not shown in FIG. 9. First gate 82 is in an ingress position and is located remotely from first cam follower 76. Second gate 84 is in an egress position and is located remotely from second cam follower 80. As drum cam 46 rotates in a clockwise direction, second member 44 will move to the right with respect to first member 42 towards an extended position. Because first cam follower 76 is not engaged with first cam path 48, first member 42 does not move to the right at this time. Furthermore, first gate 82 is not radially aligned with first cam follower 76 and therefore first cam follower 76 has no access to first cam path 48 at this stage of the cycle.

Figure 10:
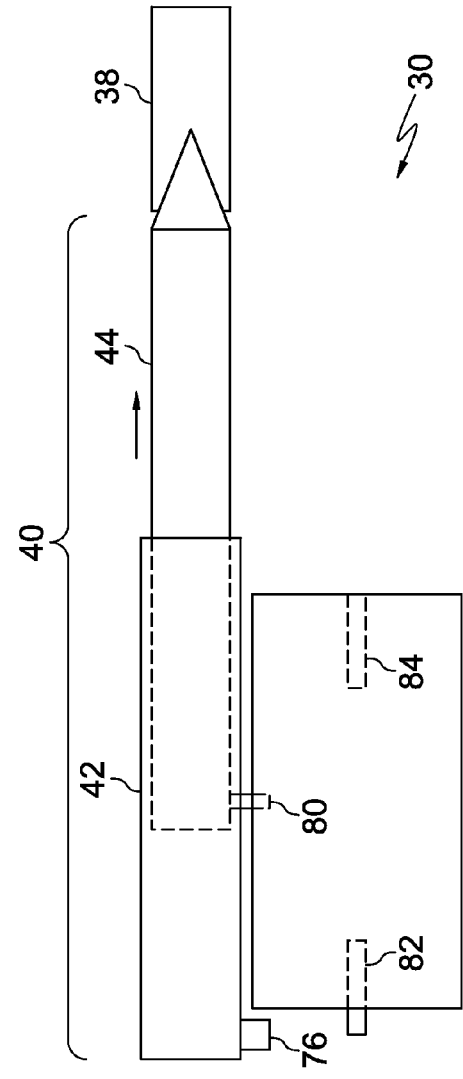
FIG. 10 is a schematic side view similar to FIG. 9 illustrating movement of an inner member of the rammer subassembly towards an extended position as the drum cam rotates.

FIG. 10 illustrates loading machine 30 after drum cam 46 has rotated approximately 90° from the position in FIG. 9. At this stage, second member 44 extends partially out from first member 42 and first and second gates 82 and 84 have moved towards rotated rammer subassembly 40 due to the rotation of drum cam 46.

FIG. 11 illustrates loading machine 30 after continued rotation of drum cam 46 causes second member 44 to reach the end of slot 78. At this stage, second member 44 extends no further from first member 42. Additionally, blocking member 70 extends to a blocking position to prevent second member 44 from retracting inwardly into first member 42. Accordingly, until blocking member 70 retract, there will be no relative motion between first member 42 and second member 44.

FIG. 12 illustrates drum cam 46 after approximately 180° of rotation from a position in FIG. 9. At this point in the cycle, first and second openings 86 and 88 and first and second gates 82 and 84 come into alignment with first and second cam followers 76 and 80, respectively. Second member 44 has pulled first member 42 towards drum cam 46, first cam follower 76 engages first gate 82 and second cam follower 80 engages second gate 84. Continued rotation of drum cam 46 beyond this point will cause first gate 82 to guide first cam follower 76 to pass through first opening 86 and into engagement with first cam path 48 and will cause second gate 84 to guide second cam follower 80 to pass through second opening 88 where it will disengage from second cam path 50.

FIG. 13 illustrates that the continued rotation of drum cam 46 causes first member 42 to move towards a deployed position, and hence causes rammer subassembly 40 moves towards a loading position. This movement is driven by engagement between first cam follower 76 and first cam path 48. Additionally, now that first member 42 and second member 44 have passed through first gate 82 and second gate 84, respectively, first gate 82 has moved to an egress position and second gate 84 has moved to an ingress position. The respective movements of first gate 82 and second gate 84 may be controlled through the use of spring loading mechanisms, detents, and triggers which are well known in the art.

FIG. 14 illustrates loading machine 30 after drum cam 46 has rotated a total of approximately 360° from the position illustrated in FIG. 9. At this point in the cycle, rammer subassembly 40 has reached a loading position and deposits a payload into the receiver. First cam path 48 changes direction and, upon continued rotation of drum cam 46, will begin to urge first cam follower 76 towards the left, thus moving first member 42 back towards a home position. As first member 42 moves towards a home position, it will pull second member 44 with it through engagement between slot 78 and second cam follower 80.

FIG. 15 illustrates loading machine 30 after drum cam 46 has rotated an approximately 180° from the position depicted in FIG. 14. At this stage of the cycle, first gate 82 is positioned to encounter first cam follower 76, first cam follower 76 engages first gate 82, second gate 84 is positioned to encounter second cam follower 80, and second cam follower 80 engages second gate 84.

FIG. 16 illustrates loading machine 30 after drum cam 46 has rotated slightly beyond the position illustrated in FIG. 15. First gate 82 guides first cam follower 76 through first opening 86 where first cam follower 76 will disengage from first cam path 48. Second gate 84 guides second cam follower 80 through second opening 88 and into engagement with second cam path 50. At approximately this time in the cycle, blocking member 70 will retract from a blocking position to a recess position to permit second member 44 to retract within first member 42.

Figure 17:
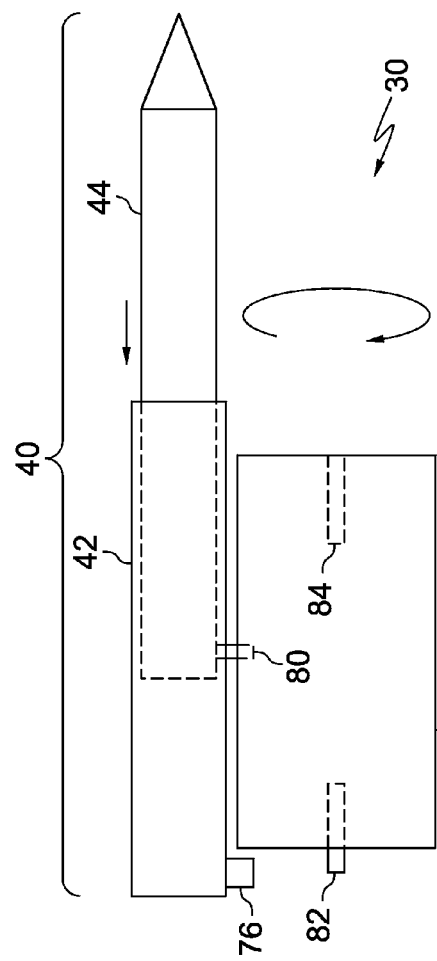
FIG. 17 is a schematic side view similar to FIG. 9 illustrating the outer member of the rammer subassembly back in a home position and movement of the inner member of the rammer subassembly with respect to the outer member towards a retracted position.

FIG. 17 illustrates loading machine 30 after drum cam 46 has rotated approximately 90° from the position depicted in FIG. 15. At this point in the cycle, second member 44 is retracting within first member 42 under urging by second cam path 50 on second cam follower 80. First gate 82 has returned to an ingress position in preparation for a next encounter with first cam follower 76 and second gate 84 has returned to an egress position in preparation for a next encounter with second cam follower 80.

Figure 18:
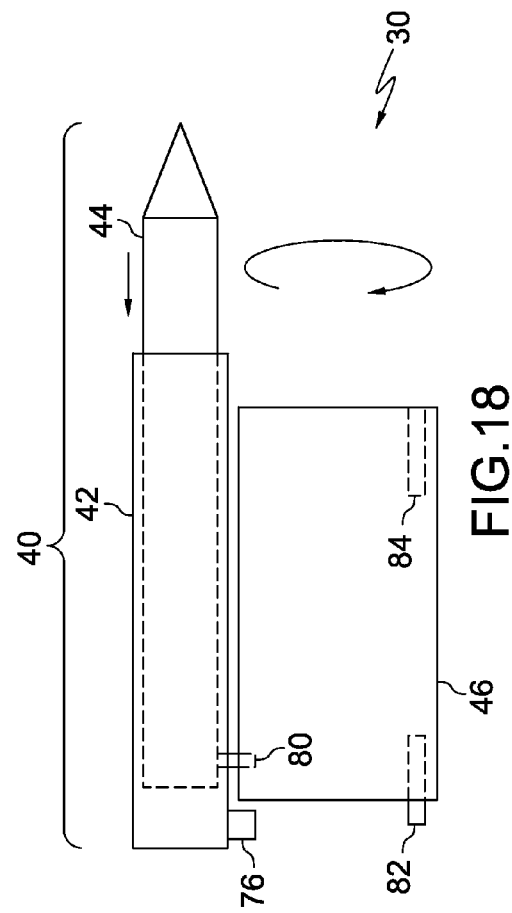
FIG. 18 is a schematic side view similar to FIG. 9 illustrating the rammer subassembly back in a receiving position ready to receive the next payload, the outer member of the rammer subassembly back in a home position and the inner member of the rammer subassembly back in a retracted position.

FIG. 18 illustrates loading machine 30 after drum cam 46 is rotated approximately 180° from the position depicted in FIG. 15. Rammer subassembly 40 has returned to a receiving position where it is ready to receive a new payload, first member 42 is in a home position, second member 44 is in a retracted position, first cam follower 76 is disengaged from first cam path 48. Second cam follower 80 remains engaged with second cam path 50, and, upon continued rotation of drum cam 46, will change direction to begin the next cycle.

Figure 20:
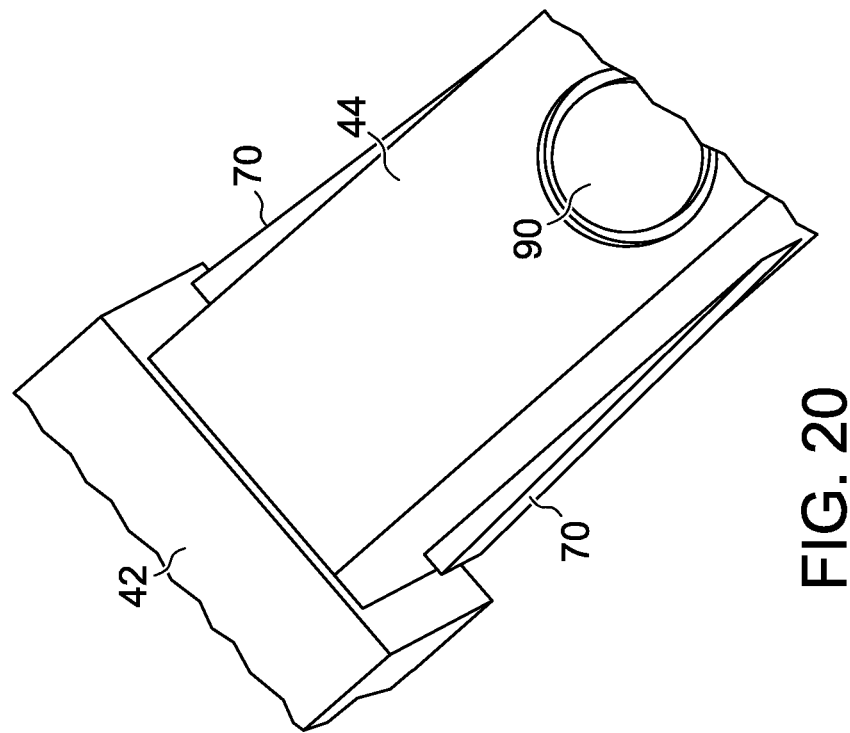
FIG. 20 is a perspective view similar to FIG. 19 illustrating the blocking member illustrated in a blocking position.
Figure 19:
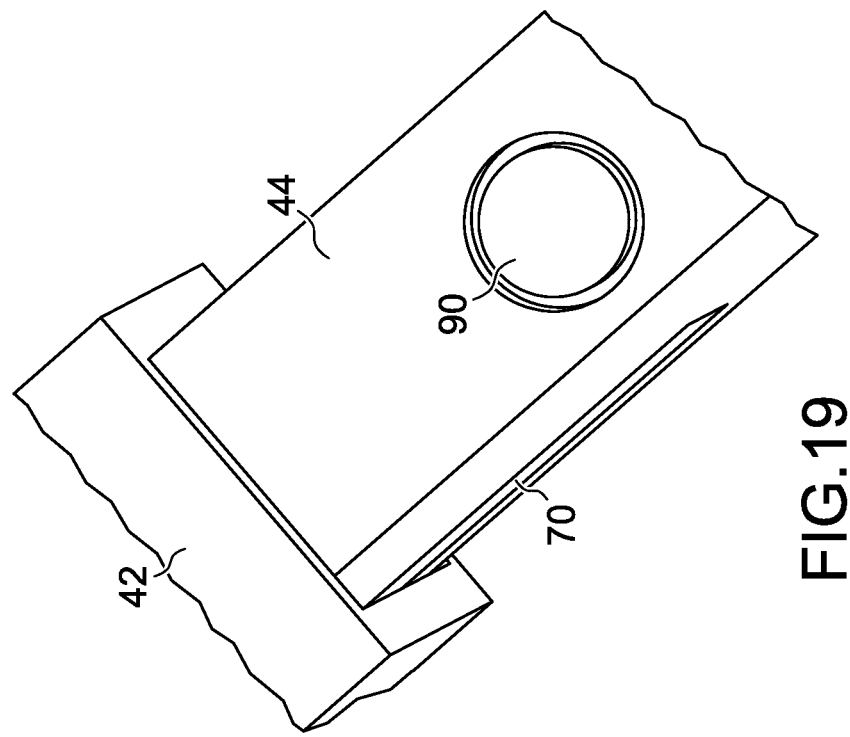
FIG. 19 is a perspective view illustrating a blocking member mounted to the inner member of the rammer, the blocking member illustrated in a recessed position.

FIG. 19 and FIG. 20 are perspective views from above second member 44, illustrating operation of blocking member 70. Blocking member 70 is in a recessed position in FIG. 19 and is in a blocking position in FIG. 20. Blocking member 70 serves to obstruct inward movement of second member 44 into first member 42 as first member 42 moves longitudinally back and forth with respect to the drum cam. Blocking member 70 may take any suitable shape and/or configuration effective to obstruct such movement between first and second members 42 and 44. Although the embodiment illustrated in FIG. 19 and FIG. 20 depicts a two section blocking member that is configured to protrude from opposite lateral sides of second member 44, it should be understood that in other embodiments, blocking member 70 may have only a single component while in still other embodiments, blocking member 70 may include more than two more elements.

In the illustrated embodiment, both sections of blocking member 70 are pivotably mounted to a pin 90 that extends through second member 44. Both sections of blocking member 70 are also spring-loaded and urged towards respective blocking positions. When second member 44 moves outwardly from first member 42, the two sections of blocking member 70 are compressed towards their recessed positions by engagement with an opening in first member 42. Once both sections of blocking member 70 pass through and are clear of the opening in first member 42, the sections will move back to the blocking position under the urging of their respective springs. An actuator may be mounted onto loading machine 30 and positioned and configured to drive the two sections of blocking member 70 back towards recessed position after drum cam 46 has rotated approximately 540° from the start of the cycle to the point where second member 44 will be urged to retract within first member 42. In other embodiments, blocking members may be mounted on first member 42 and may be configured to extend from first member 42 into pockets defined in second member 44. In still other embodiments, any mechanism effective to control and synchronize the movement of blocking member 70 between a recess position and a blocking position may be used.

Figure 21:
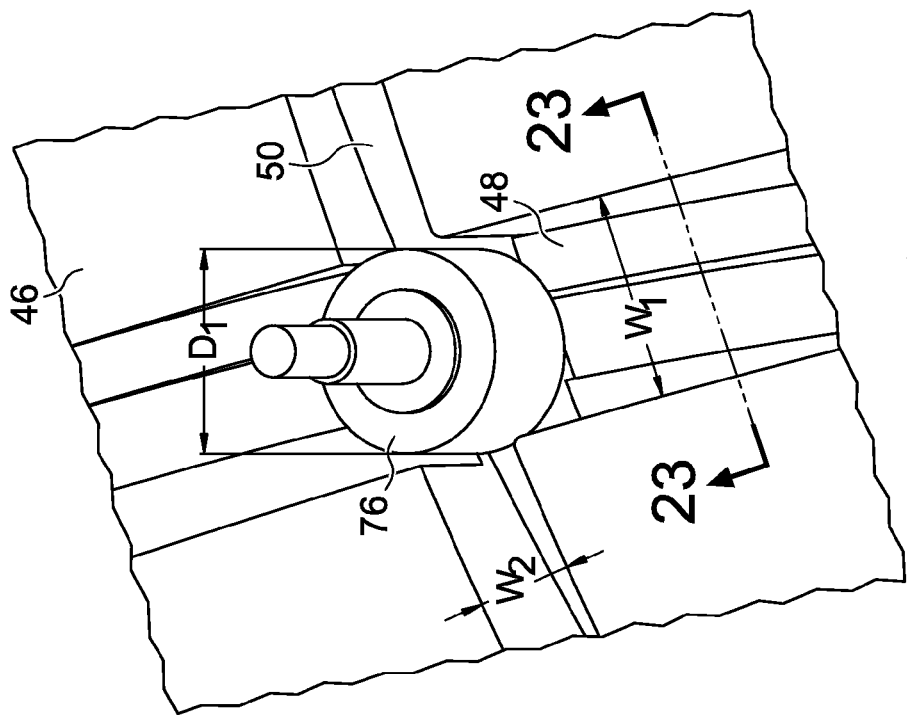
FIG. 21 is a perspective view illustrating an intersection of two cam paths on the drum cam and a cam follower of the outer member of the rammer subassembly crossing the intersection.

FIG. 21 is a perspective view illustrating an intersection of first and second cam paths 48 and 50 with first cam follower 76 passing through the intersection. To ensure that first cam follower 76 does not leave first cam path 48 and follow second cam path 50, first cam path 48 and second cam path 50 have been given different widths. First cam path 48 has a width of W1 and second cam path 50 is the width of W2. In the illustrated embodiment, W1 is greater than W2. Furthermore, first cam follower 76 has been given a diameter D1 that is slightly smaller than W1, but larger than W2. The substantial conformity of diameter D1 with the width W1 insures relatively smooth and stable movement of first cam follower 76 through first cam path 48 while also inhibiting first cam follower 76 from entering second cam path 50 due to the fact that diameter D1 exceeds width W2. In some embodiments, the walls forming first cam path 48 and second cam path 50 may be rounded at an intersection point to reduce the likelihood of any harsh collisions between such walls and first cam follower 76.

Figure 22:
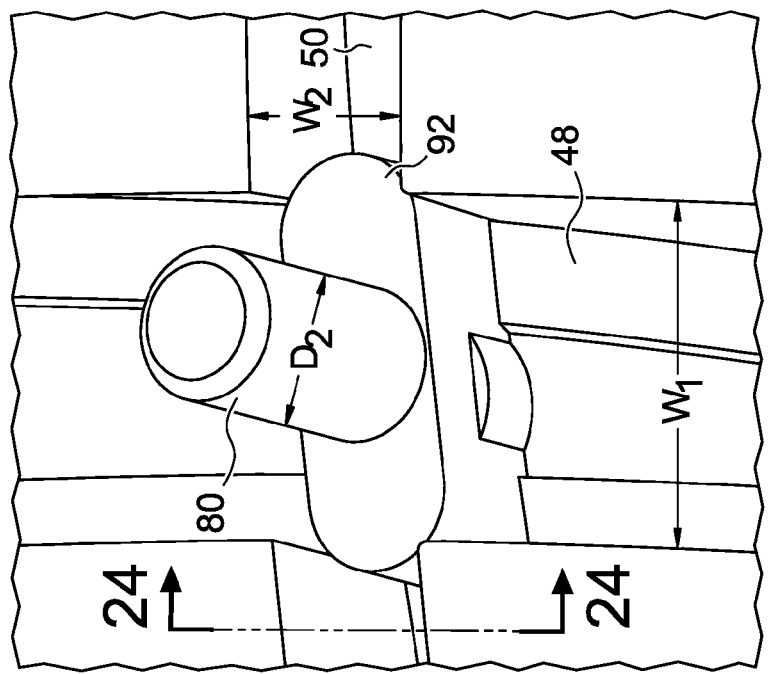
FIG. 22 is a perspective view illustrating the intersection of the two cam paths on the drum cam and a cam follower of the inner member of the rammer subassembly crossing the intersection.

FIG. 22 is a perspective view illustrating the intersection of first cam path 48 with second cam path 50 and second cam follower 80 passing through the intersection. Second cam follower 80 has a diameter D2 that is slightly smaller than width W2. As before, this substantial conformity will allow second cam follower 80 pass through second cam path 50 in a smooth and stable manner. To ensure that second cam follower 80 does not cross over onto first cam path 48, second cam follower 80 has been fitted with a spanning member 92. Spanning member 92 is an oblong body fitted around a portion of second cam follower 80 and which has a longitudinal dimension that exceeds width W1 of first cam path 48. By spanning the gap from one side of the intersection with first cam path 48 to the other side, spanning member 92 inhibits second cam follower from entering first cam path 48.

Figure 23:
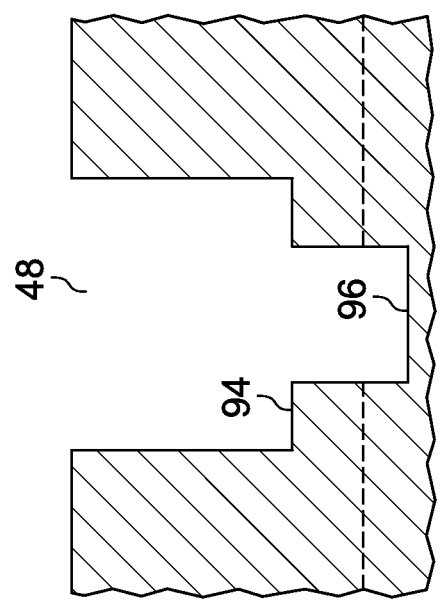
FIG. 23 is a schematic side view of the intersection of the two cam paths from the perspective of a cam follower traveling through the first path.
Figure 24:
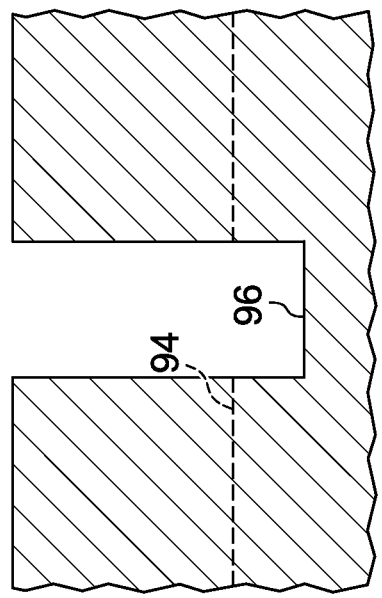
FIG. 24 is a schematic side view of the intersection of the two cam paths from the perspective of a cam follower traveling through the second path.

FIG. 23 and FIG. 24 are schematic side views of the intersection of the two cam paths and illustrate another feature that enables the cam followers to stay on respective cam paths. With continuing reference to FIG. 1 through FIG. 24, FIG. 23 schematically depicts the intersection from the perspective of first cam follower 76 traveling through first cam path 48. As illustrated, the floors of the respective cam paths are positioned at different depths. A first cam path floor 94 of first cam path 48 is situated above a second cam path floor 96 of second cam path 50. FIG. 24 schematically depicts the same intersection, but from the perspective of second cam follower 80.

By providing cam paths with different depths, and by providing second cam follower 80 with a length that corresponds with the depth of second cam path floor 96, second cam follower 80 will be inhibited from leaving a cam path and crossing over to first cam path 48 because the difference in depths will create a low wall that will keep second cam follower 80 aligned with second cam path 50. For added certainty, the use of cam paths having differing depths may be combined with the use of spanning member 92. Additionally, as illustrated in FIG. 23, a channel may be defined below first cam path floor 94 to provide a guide for a protrusion extending below first cam follower 76. This added protrusion/channel combination may further inhibit first cam follower 76 from leaving first cam path 48 as first cam follower 76 passes through each cam path intersection. In addition to the above, any other mechanism, configuration, or technique effective to keep each cam follower on a respective cam path may be used together with loading machine 30 without departing from the teachings.

Figure 25:
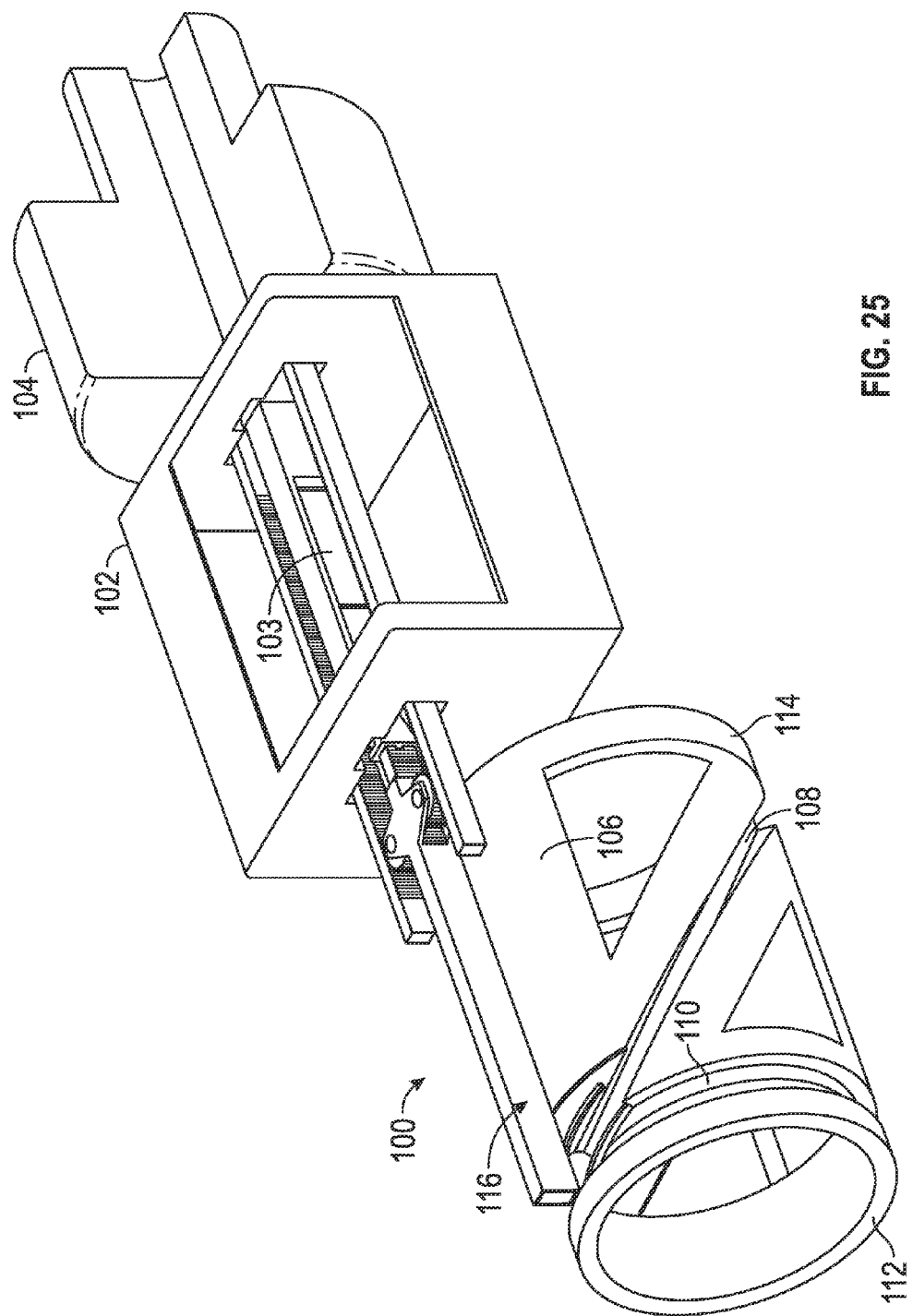
FIG. 25 is a perspective environmental view illustrating an alternate non-limiting embodiment of a loading machine for feeding a receiver in accordance with the teachings of the present disclosure.

FIGS. 25-30 illustrate an alternate embodiment of a loading machine 100 for feeding a receiver. FIG. 25 is a perspective environmental view illustrating loading machine 100 engaged with a magazine 102. For purposes of simplification, loading machine 100 has been illustrated without a motor, but it should be understood that when deployed, loading machine 100 would include a motor configured to spin drum cam 106. It should be further understood that such motor would be positioned in substantially the same location (e.g., within a drum cam) as discussed above with respect to FIGS. 1-24. Magazine 102 is configured to hold a plurality of projectiles 103 for loading into a receiver 104. In FIG. 25, receiver 104 is illustrated as being the breech of a rail gun (with a portion torn away to permit viewing the interior) but it should be understood that loading machine 100 is compatible for use with many different type of receivers and that the teachings of the present disclosure is not limited to use with rail guns.

Loading machine 100 includes a drum cam 106 having two cam paths defined in its surface, a cam path 108 and a cam path 110. Cam path 108 forms a loop around a periphery of drum cam 106 that extends substantially between an end 112 and an end 114 of drum cam 106. Loading machine 100 further includes a rammer subassembly 116, illustrated in a retracted position. When rammer subassembly 116 moves from the retracted position to an extended position (see FIG. 28), rammer subassembly 116 moves projectile 103 into receiver 104.

Figure 26:
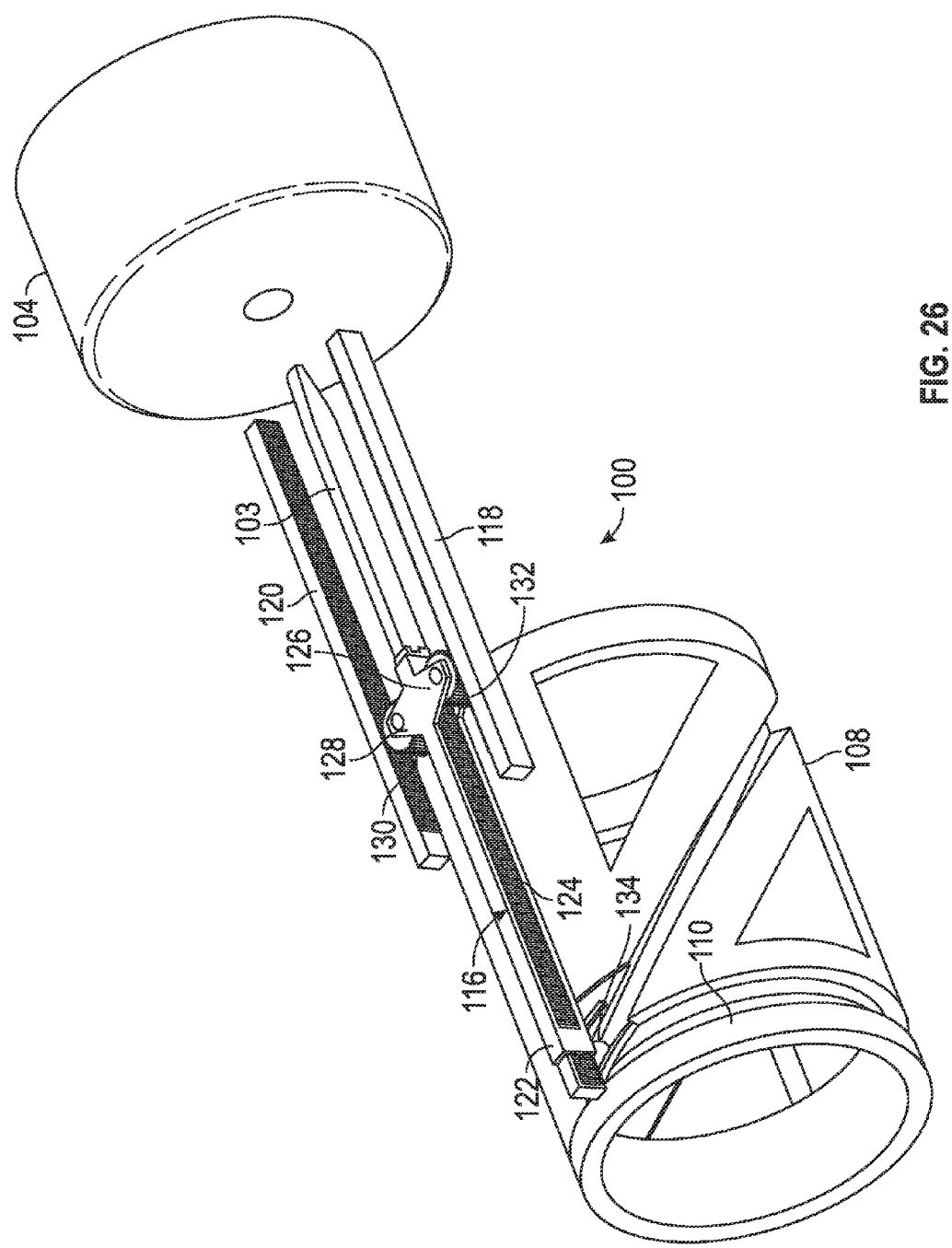
FIG. 26 is a perspective view of the loading machine of FIG. 25 with a rammer sub-assembly disposed in a retracted position.

FIG. 26 is a perspective view of loading machine 100 positioned adjacent receiver 104 and with magazine 102 removed (see FIG. 25). In this view, projectile 103 is unobstructed. Also unobstructed in this view are tracks 118 and 120 which are oriented to be substantially parallel with rammer subassembly 116. It should be understood that tracks 118 and 120 are mounted to a structure such as a housing or other support that has been eliminated from these illustrations for the purposes of simplification. Tracks 118 and 120 include gear teeth for engagement with rammer subassembly 116.

Rammer subassembly 116 includes a rammer section 122 and a rammer section 124 that are telescopically coupled with respect to one another such that rammer section 124 is configured to slide in and out of rammer section 122. The position of rammer subassembly 116 depicted in FIG. 26 will be referred to herein as the retracted position. For ease of illustration, a large opening in a lateral wall of rammer section 122 has been cut away to permit observation of rammer section 124 retracted within rammer section 122. When deployed, the opening in the lateral wall of rammer section 122 would be far smaller than depicted.

Rammer section 122 includes a wing portion 126 and a wing portion 128 that project outwardly in a lateral direction from rammer section 122. A gear 130 and a gear 132 are mounted to wing portion 126 and wing portion 128, respectively, and are configured to rotate with respect to wing portions 126 and 128. Although only two winged portions and two gears are illustrated, it should be understood that in other embodiments any desirable number of winged portions and/or any desirable number of gears may be utilized. Gear 130 and gear 132 are in meshed engagement with the gear teeth of tracks 118 and 120. Rammer section 124 includes a set of gear teeth (see FIGS. 29 and 30) disposed on opposite lateral walls of rammer section 124 which are also in meshed engagement with gears 130 and 132.

Rammer section 122 further includes a cam follower 134 that is configured to follow cam paths 108 and 110. When engaged with cam path 110 while drum cam 106 is spinning, cam follower 134 will not be urged forward or backward by cam path 110. As a result, so long as cam follower 134 remains engaged with cam path 110, rammer subassembly 116 will remain in a single longitudinal location with respect to drum cam 106. This will be referred to herein as a "dwell" position of rammer subassembly 116. In the illustrated embodiment, cam path 110 is positioned near end 112 such that the dwell position coincides with the retracted position. It should be understood that in other embodiments, the dwell position need not coincide with the retracted position.

Figure 27:
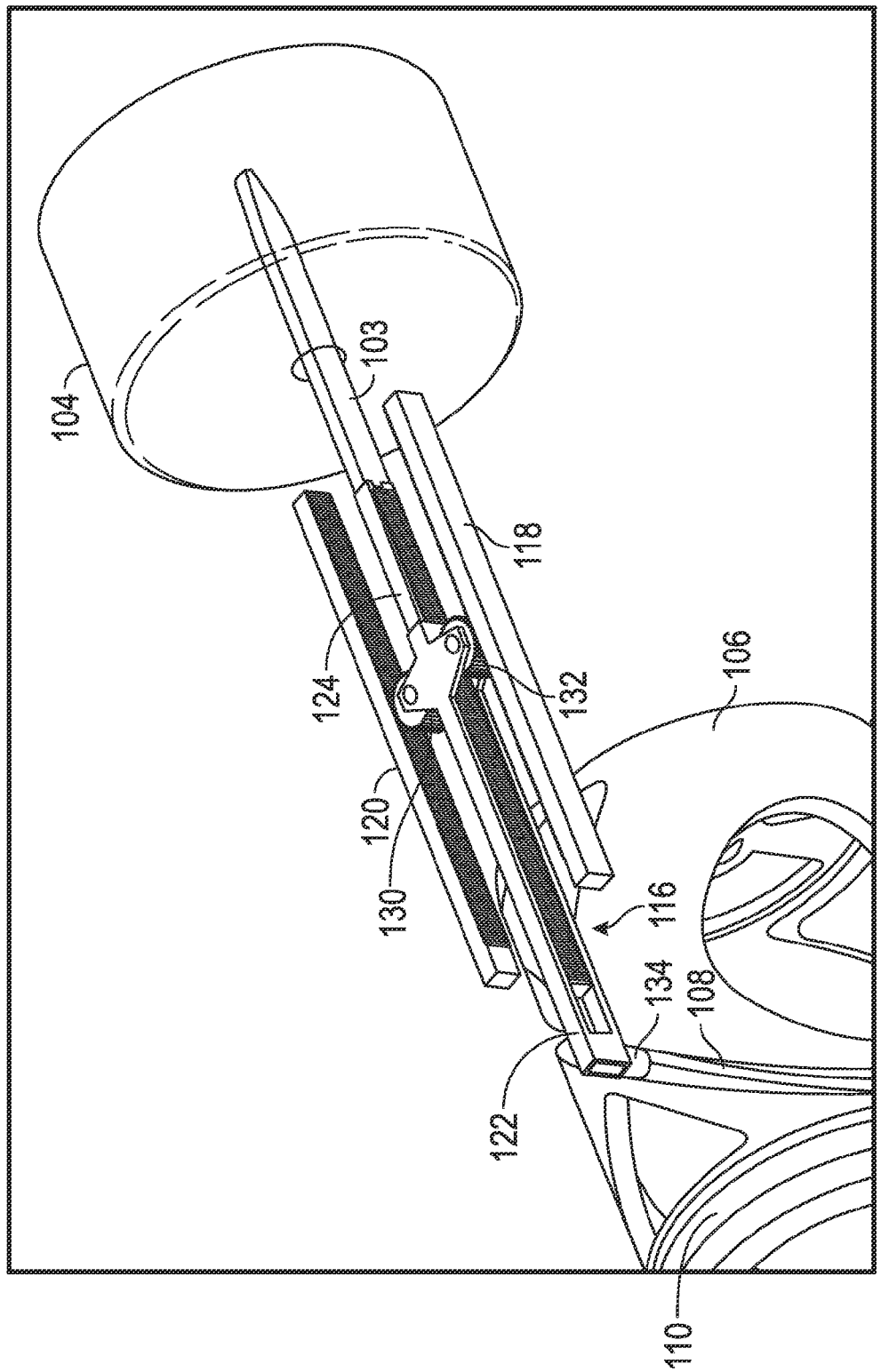
FIG. 27 is a perspective similar to FIG. 26 illustrating the rammer sub-assembly as it moves towards an extended position.

With respect to FIG. 27, cam follower 134 has been routed onto cam path 108, and movement of rammer subassembly 116 out of the retracted position is underway. As drum cam 106 rotates, cam follower 134 engages the walls of cam path 108 and is driven in a forward direction (i.e., towards receiver 104). As cam follower 134 is moved forward, it causes rammer section 122 to move forward. When rammer section 122 moves forward, gears 130 and 132 will rotate due to their meshed engagement with track 118 and track 120, respectively. The rotation of gears 130 and 132 will, in turn, drive rammer section 124 forward with respect to rammer section 122. The forward movement of both rammer section 122 and rammer section 124 moves projectile 103 towards receiver 104.

Figure 28:
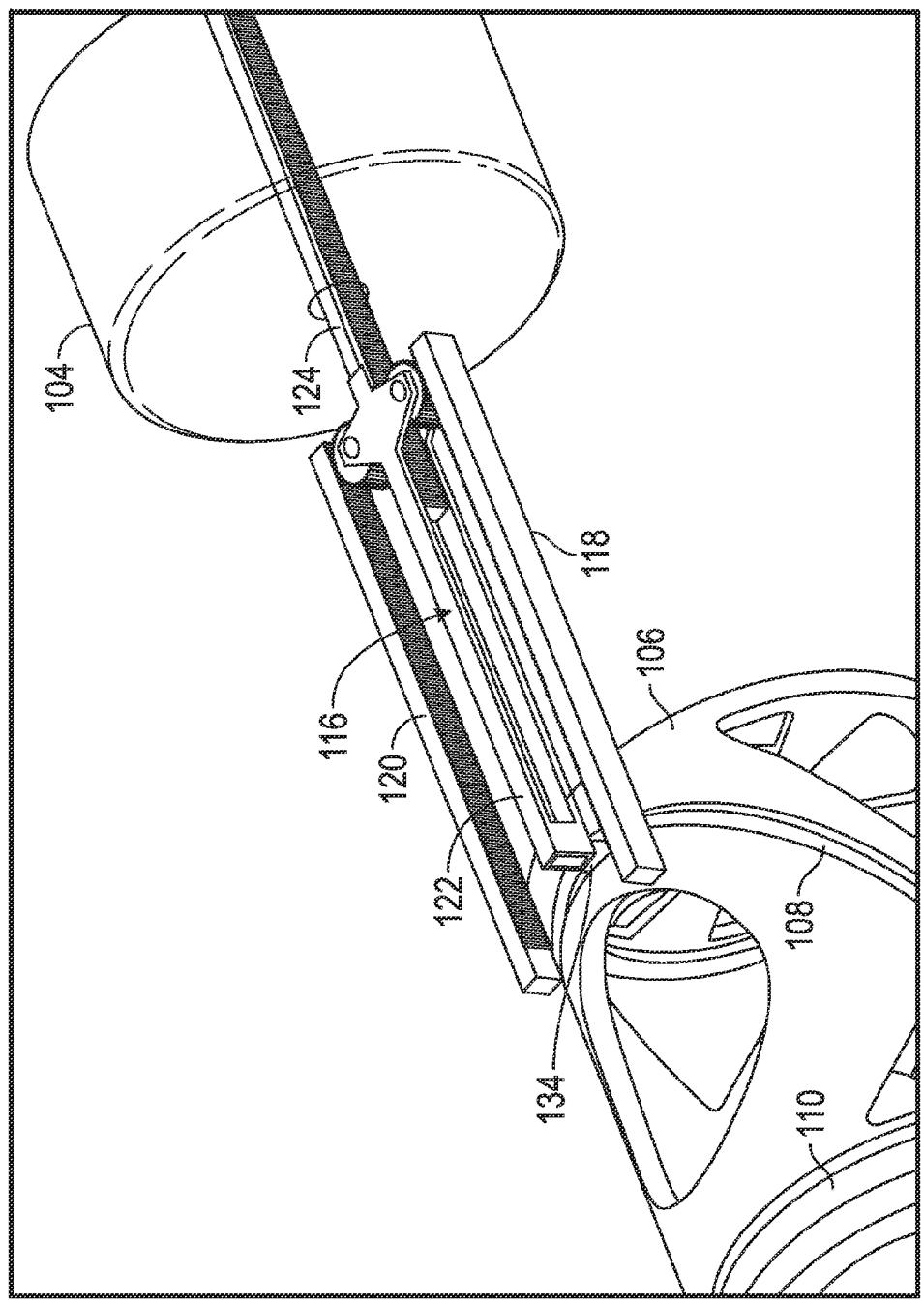
FIG. 28 is a perspective view similar to FIG. 27 illustrating the rammer sub-assembly disposed in an extended position.

With respect to FIG. 28, cam follower 134 has reached a longitudinal end of cam path 108 and, as a result, rammer section 122 and rammer section 124 have ceased movement in a forward direction. When cam follower 134 reaches this portion of cam path 108, rammer subassembly 116 is in the extended position and projectile 103 (not shown in FIG. 28) is fully seated within receiver 104.

With respect to the embodiment illustrated in FIGS. 25-30, wing portion 126 and wing portion 128 are positioned so as to be located at the approximate center of rammer subassembly 116 when rammer subassembly 116 is in the extended position. The meshed engagement of gears 130 and 132 with tracks 118 and 120, respectively, and the meshed engagement of gears 130 and 132 with the gear teeth defined in the lateral walls of rammer section 124 provide buttressing support to a central portion of rammer subassembly 116 while rammer subassembly 116 is in the extended position. Such positioning of gears 130 and 132 provides robust opposition to buckling forces that naturally act on the central portion of rammer subassembly 16 during the final stages of its forward motion.

When drum cam 106 continues to spin past the point illustrated in FIG. 28, cam path 108 will begin to pull cam follower 134 in a rearward direction (i.e., away from receiver 104). This will move rammer section 122 in a rearward direction. The movement of rammer section 122 in a rearward direction will, in turn, cause gears 130 and 132 to rotate in a direction opposite to their direction of rotation during forward movement of rammer section 122. This opposite rotation of gears 130 and 132 will drive rammer section 124 in a rearward direction, thus retracting into rammer section 122. When the rotation of drum cam 106 reaches the point where cam follower 134 once again resides in the position illustrated in FIG. 26, rammer subassembly 116 will have returned to the retracted position and will be ready to receive the next projectile 103.

Figure 29:
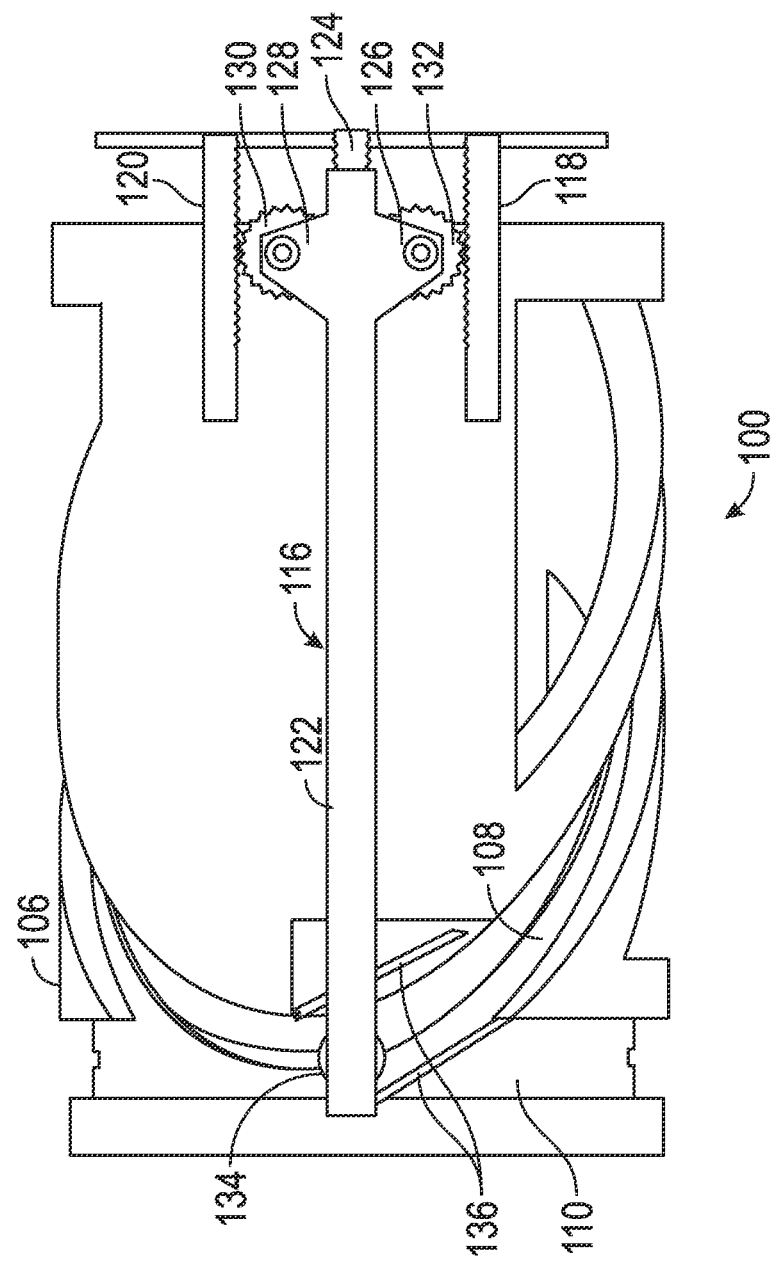
FIG. 29 is a plan view of a portion of the loading machine of FIG. 26 illustrating two cam paths on a drum cam and a gate positioned to guide a cam follower onto a first cam path.

FIG. 29 is a plan view illustrating a portion of loading machine 100. In this view, drum cam 106 is rotated to a position corresponding with rammer subassembly 116 residing in the retracted position. A portion of cam path 108 and cam path 110 overlap and cam follower 134 is currently disposed in the overlapping portion. A gate 136 is pivotally coupled to drum cam 106 proximate the overlapping portion and is configured to guide cam follower 134 onto one of the two cam paths. In the position illustrated in FIG. 29, gate 136 is disposed to guide cam path follower 134 onto cam path 108 as drum cam 106 rotates. FIG. 29 also clearly depicts the meshed engagement between gear 132 and track 118 and also the meshed engagement between gear 130 and track 120.

With respect to FIG. 30, gate 136 has pivoted to a second position. In this position, gate 136 is configured to guide cam follower 134 into cam path 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A loading machine for feeding a receiver, the loading machine comprising:
   a drum cam configured to rotate, the drum cam having a cam path;
   a first track positioned proximate the drum cam; and
   a rammer subassembly engaging the drum cam and the first track, the rammer subassembly configured to move between an extended position and a retracted position as the drum cam rotates, the rammer subassembly comprising:
      a first rammer section engaged with the cam path and configured to move longitudinally during rotation of the drum cam, the first rammer section including a first gear engaged with the first track such that longitudinal movement of the first rammer section causes rotation of the first gear, and
      a second rammer section telescopically coupled with the first rammer section and engaged with the first gear such that rotation of the first gear causes the second rammer section to telescopically move with respect to the first rammer section,
   wherein the first rammer section defines an opening exposing a portion of the second rammer section and wherein the portion of the second rammer section and the first gear are engaged through the opening.

2. The loading machine of claim 1, wherein the first rammer section includes a wing portion extending laterally from the first rammer section, and wherein the first gear is rotationally mounted to the wing portion.

3. The loading machine of claim 1, further comprising a second track disposed proximate the drum cam, wherein the first rammer section includes a second gear engaged with the second track such that longitudinal movement of the first rammer section causes rotation of the second gear, and wherein the second rammer section is engaged with the second gear such that rotation of the second gear causes the second rammer section to telescopically move with respect to the first rammer section.

4. The loading machine of claim 1, wherein the drum cam has a first end and a second end, wherein the cam path comprises a loop around a periphery of the drum cam, wherein the loop extends between the first end and the second end, wherein a first portion of the loop proximate the first end corresponds with the extended position of the subassembly and wherein a second portion of the loop proximate the second end corresponds with the retracted position of the subassembly.

5. The loading machine of claim 1, wherein the first rammer section and the second rammer section are configured to substantially overlap when the rammer subassembly is in the extended position.

6. The loading machine of claim 1, wherein the first gear and the first track are in meshed engagement and wherein the first gear and the second rammer section are in meshed engagement.

7. The loading machine of claim 1, wherein the second rammer section is in sliding engagement with the first rammer section.

8. The loading machine of claim 7, wherein the second rammer section is disposed within the first rammer section.

9. The loading machine of claim 1, wherein the first gear is disposed at an approximate longitudinal center of the rammer subassembly when the rammer subassembly is in the extended position.

10. The loading machine of claim 1, wherein the first rammer section and the second rammer section have substantially rectangular cross sections.

11. A loading machine for feeding a receiver, the loading machine comprising:
a drum cam configured to rotate, the drum cam having a first end, a second end, a first cam path, and a second cam path, the first cam path comprising a first loop around a periphery of the drum cam and extending substantially between the first end and the second end, the second cam path comprising a second loop around a circumference of the drum cam;
a first track positioned proximate the drum cam; and
a rammer subassembly engaging the drum cam and the first track, the rammer subassembly configured to alternately engage the first cam path and the second cam path, the rammer subassembly configured to move between an extended position and a retracted position as the drum cam rotates when the rammer subassembly is engaged with the first cam path, and the rammer subassembly configured to remain in the retracted position as the drum cam rotates when the rammer subassembly is engaged with the second cam path, the rammer subassembly comprising:
a first rammer section configured to alternately engage the first cam path and the second cam path, the first rammer section configured to move longitudinally during rotation of the drum cam when engaged with the first cam path, the first rammer section including a first gear engaged with the first track such that longitudinal movement of the first rammer section causes rotation of the first gear, the first rammer section further configured to remain substantially stationary during rotation of the drum cam when engaged with the second cam path, and
a second rammer section telescopically coupled with the first rammer section and engaged with the first gear such that rotation of the first gear causes the second rammer section to telescopically move with respect to the first rammer section,
wherein the first rammer section defines an opening exposing a portion of the second rammer section and wherein the portion of the second rammer section and the first gear are engaged through the opening.

12. The loading machine of claim 11, wherein the second loop is disposed proximate one of the first end and the second end of the drum cam.

13. The loading machine of claim 11, further comprising a gate selectively operable to cause the rammer subassembly to alternately engage the first loop and the second loop.

14. The loading machine of claim 11, wherein the first rammer section includes a wing portion extending laterally from the first rammer section, and wherein the first gear is rotationally mounted to the wing portion.

15. The loading machine of claim 11, wherein the first rammer section and the second rammer section are configured to substantially overlap when the rammer subassembly is in the extended position.

16. The loading machine of claim 11, wherein the first gear and the first track are in meshed engagement and wherein the first gear and the second rammer section are in meshed engagement.

17. The loading machine of claim 11, wherein the first gear is disposed at an approximate longitudinal center of the rammer subassembly when the rammer subassembly is in the extended position.

18. A loading machine for feeding a receiver, the loading machine comprising:
a drum cam configured to rotate, the drum cam having a first end, a second end, a first cam path and a second cam path, the first cam path comprising a first loop around a periphery of the drum cam and extending substantially between the first end and the second end, the second cam path comprising a second loop around a circumference of the drum cam, a first portion of the first cam path overlapping with a second portion of the second cam path;
a first track positioned proximate the drum cam;
a second track positioned proximate the drum cam; and
a rammer subassembly engaging the drum cam, the first track, and the second track, the rammer subassembly configured to alternately engage the first cam path and the second cam path, the rammer subassembly configured to move between an extended position and a retracted position as the drum cam rotates when the rammer subassembly is engaged with the first cam path, and the rammer subassembly configured to remain in the retracted position as the drum cam rotates when the rammer subassembly is engaged with the second cam path, the rammer subassembly comprising:
a first rammer section configured to alternately engage the first cam path and the second cam path, the first rammer section including a first wing portion extending from a first lateral side of the first rammer section and a second wing portion extending from a second lateral side of the first rammer section, a first gear rotationally mounted to the first wing portion, and a second gear rotationally mounted to the second wing portion, the first gear and the second gear engaged with the first track and the second track, respectively such that longitudinal movement of the first rammer section causes rotation of the first gear and rotation of the second gear, the first rammer section configured to move longitudinally during rotation of the drum cam when the first rammer section is engaged with the first cam path, the first rammer section further configured to remain substantially stationary during rotation of the drum cam when the first rammer section is engaged with the second cam path, and a second rammer section telescopically coupled with the first rammer section and engaged with the first gear and the second gear such that rotation of the first gear and rotation of the second gear causes the second rammer section to telescopically move with respect to the first rammer section.

* * * * *